United States Patent
Downs

(10) Patent No.: US 11,305,213 B2
(45) Date of Patent: Apr. 19, 2022

(54) FILTER ELEMENT WITH TORSION LOCK AND/OR SLIDING PISTON, ASSEMBLY AND METHODS

(71) Applicant: Parker-Hannifin Corporation, Cleveland, OH (US)

(72) Inventor: Kevin B. Downs, Coventry, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/690,938

(22) Filed: Nov. 21, 2019

(65) Prior Publication Data

US 2020/0086241 A1 Mar. 19, 2020

Related U.S. Application Data

(63) Continuation of application No. PCT/US2018/035286, filed on May 31, 2018.
(Continued)

(51) Int. Cl.
*B01D 27/08* (2006.01)
*F16D 1/108* (2006.01)
*B01D 27/14* (2006.01)

(52) U.S. Cl.
CPC .......... *B01D 27/08* (2013.01); *B01D 27/144* (2013.01); *F16D 1/108* (2013.01)

(58) Field of Classification Search
CPC ........ B01D 2201/295; B01D 2201/303; B01D 2201/347; B01D 2201/4015;
(Continued)

(56) References Cited

U.S. PATENT DOCUMENTS 2,471,069 A * 5/1949 Le Clair ................ B01D 35/30
 210/423
3,370,708 A 2/1968 Hultgren et al.
(Continued)

FOREIGN PATENT DOCUMENTS

CN 203585477 U 5/2014
CN 104455825 A 9/2014
(Continued)

OTHER PUBLICATIONS

"Machine Translation of CN104645681A", Sun et al., published May 27, 2015, 23 total pages. (Year: 2015).*
(Continued)

*Primary Examiner* — Dirk R Bass
(74) *Attorney, Agent, or Firm* — Reinhart Boerner Van Deuren P.C.

(57) ABSTRACT

A filtration assembly is provided that comprises a filter cartridge and a filter head, that has particular application for liquid filtration, such as engine fuel filtration in an embodiment. The filter cartridge can include a thread and a torsion lock detent to provide twist and lock mounting to the filter head. Separately, the filter cartridge can include a slidable piston that can become pressurized by application of liquid pressure during operation that can apply an axial force to the filter head to load the thread and increase threaded attachment rigidity and/or the natural frequency of the filter cartridge to a more desirable level, and thereby limit vibrational impacts.

28 Claims, 12 Drawing Sheets

Related U.S. Application Data

(60) Provisional application No. 62/513,214, filed on May 31, 2017.

(58) Field of Classification Search
CPC .......... B01D 2201/4076; B01D 27/08; B01D 27/144; B01D 29/21; B01D 29/96; B01D 35/30; F16D 1/108
See application file for complete search history.

(56) References Cited

U.S. PATENT DOCUMENTS

| | | |
|---|---|---|
| 3,384,241 A | 5/1968 | Nostrand |
| 3,420,377 A | 1/1969 | Vandersip |
| 3,630,375 A | 12/1971 | Hodgkins |
| 3,753,544 A | 8/1973 | Hodgkins |
| 3,829,014 A | 8/1974 | Davis et al. |
| 3,988,244 A | 10/1976 | Brooks |
| 4,126,557 A | 11/1978 | Hodgkins |
| D254,086 S | 1/1980 | Hodgkins |
| 4,244,916 A | 1/1981 | Guigan |
| 4,265,748 A * | 5/1981 | Villani ............... B01D 27/08 210/132 |
| 4,312,479 A | 1/1982 | Tolan |
| 4,372,847 A | 2/1983 | Lewis |
| D284,300 S | 6/1986 | Hodgkins |
| 4,618,423 A | 10/1986 | Hodgkins |
| 4,719,012 A | 1/1988 | Groezinger et al. |
| 4,812,235 A | 3/1989 | Seleman et al. |
| 4,860,713 A | 8/1989 | Hodgkins |
| 4,898,668 A | 2/1990 | Hodgkins et al. |
| 4,915,831 A | 4/1990 | Taylor |
| 4,956,081 A | 9/1990 | Hodgkins et al. |
| 4,976,852 A | 12/1990 | Janik et al. |
| 5,035,797 A | 7/1991 | Janik |
| 5,078,877 A | 1/1992 | Cudaback et al. |
| 5,084,170 A | 1/1992 | Janik et al. |
| 5,102,541 A | 4/1992 | Breitbach |
| 5,114,572 A | 5/1992 | Hunter et al. |
| 5,186,829 A | 2/1993 | Janik |
| 5,203,994 A | 4/1993 | Janik |
| 5,236,579 A | 8/1993 | Janik et al. |
| 5,259,953 A | 11/1993 | Baracchi et al. |
| 5,271,836 A | 12/1993 | Janik et al. |
| 5,302,284 A | 4/1994 | Zeiner et al. |
| 5,312,546 A | 5/1994 | Janik |
| 5,342,511 A | 8/1994 | Brown et al. |
| 5,350,506 A | 9/1994 | Dombek et al. |
| 5,362,390 A | 11/1994 | Widenhoefer et al. |
| 5,364,528 A | 11/1994 | Schwarz et al. |
| 5,374,355 A | 12/1994 | Habiger et al. |
| 5,390,701 A | 2/1995 | Lessley et al. |
| D356,852 S | 3/1995 | Janik et al. |
| 5,413,711 A | 5/1995 | Janik |
| 5,474,676 A | 12/1995 | Janik et al. |
| 5,486,288 A | 1/1996 | Stanford et al. |
| 5,560,824 A | 10/1996 | Sann et al. |
| 5,578,221 A | 11/1996 | Janik |
| 5,614,091 A | 3/1997 | Janik et al. |
| 5,674,393 A | 10/1997 | Terhune et al. |
| 5,698,093 A * | 12/1997 | Pyle ..................... B01D 35/31 210/136 |
| 5,744,030 A * | 4/1998 | Reid .................... B01D 35/153 210/235 |
| 5,766,463 A | 6/1998 | Janik et al. |
| 5,788,859 A | 8/1998 | Biere |
| 5,817,234 A | 10/1998 | Dye et al. |
| 5,826,854 A | 10/1998 | Janvrin et al. |
| 5,837,137 A | 11/1998 | Janik |
| 5,868,931 A | 2/1999 | Janik et al. |
| 5,868,932 A | 2/1999 | Guichaoua et al. |
| 5,876,600 A | 3/1999 | Matsubara et al. |
| 5,887,573 A | 3/1999 | Janik et al. |
| 5,906,737 A | 5/1999 | Hoeppner |
| 5,915,926 A | 6/1999 | Janik et al. |
| 5,938,921 A | 8/1999 | Janik et al. |
| 5,985,142 A | 11/1999 | Belden |
| 6,007,711 A | 12/1999 | Atwood |
| 6,019,890 A | 2/2000 | Janik et al. |
| 6,048,455 A | 4/2000 | Janik |
| 6,051,144 A | 4/2000 | Clack et al. |
| 6,068,763 A | 5/2000 | Goddard |
| D435,631 S | 12/2000 | Janik et al. |
| 6,171,491 B1 | 1/2001 | Popoff et al. |
| 6,187,188 B1 | 2/2001 | Janik et al. |
| 6,193,884 B1 | 2/2001 | Magnusson et al. |
| 6,387,259 B1 | 5/2002 | Roll |
| 6,444,121 B1 | 9/2002 | Maxwell |
| 6,485,635 B1 | 11/2002 | Gandini et al. |
| 6,488,845 B1 | 12/2002 | Neufeld et al. |
| 6,495,042 B1 | 12/2002 | Knight |
| 6,500,335 B2 | 12/2002 | Janik et al. |
| 6,506,302 B2 | 1/2003 | Janik |
| 6,517,717 B1 | 2/2003 | Håkansson |
| D472,299 S | 3/2003 | Fritze |
| 6,533,931 B1 | 3/2003 | Reid |
| 6,533,933 B1 | 3/2003 | Stankowski et al. |
| D472,604 S | 4/2003 | Fritze |
| 6,565,746 B1 | 5/2003 | Stamey, Jr. et al. |
| D479,300 S | 9/2003 | Janik et al. |
| 6,615,990 B1 | 9/2003 | Jokschas et al. |
| 6,652,740 B2 | 11/2003 | Schoess |
| D484,568 S | 12/2003 | Janik et al. |
| 6,662,954 B2 | 12/2003 | Gottwald-Grill et al. |
| 6,673,250 B2 | 1/2004 | Kuennen et al. |
| 6,716,348 B1 | 4/2004 | Morgan |
| 6,723,239 B2 | 4/2004 | Maxwell |
| 6,740,234 B1 | 5/2004 | Williams et al. |
| 6,755,308 B2 | 6/2004 | Janik et al. |
| 6,863,811 B2 | 3/2005 | Janik |
| 6,881,334 B2 | 4/2005 | Janik |
| 6,896,803 B2 | 5/2005 | Cline et al. |
| 6,977,006 B2 | 12/2005 | Reid |
| 7,042,346 B2 | 5/2006 | Paulsen |
| 7,048,488 B1 | 5/2006 | Kuznetsov et al. |
| 7,070,692 B2 | 7/2006 | Knight |
| 7,081,201 B2 | 7/2006 | Bassett et al. |
| 7,412,896 B2 | 8/2008 | Janik et al. |
| 7,695,618 B2 | 4/2010 | Mules |
| 7,744,758 B2 | 6/2010 | Dworatzek et al. |
| 7,997,421 B2 | 8/2011 | Maurer et al. |
| 8,057,669 B2 | 11/2011 | Beard et al. |
| 8,733,555 B2 | 5/2014 | Moore et al. |
| 8,991,619 B2 | 3/2015 | Schweitzer |
| 9,023,202 B2 | 5/2015 | Beard et al. |
| 9,067,156 B2 | 6/2015 | Moore et al. |
| 9,314,722 B2 | 4/2016 | Reid |
| 9,492,768 B2 | 11/2016 | Fick et al. |
| 9,695,966 B2 | 7/2017 | Lombardi et al. |
| 10,252,193 B2 | 4/2019 | Rolle et al. |
| 2001/0042709 A1 | 11/2001 | Janik |
| 2002/0014452 A1 | 2/2002 | Janik |
| 2002/0043491 A1 | 4/2002 | Janik et al. |
| 2002/0130072 A1 | 9/2002 | Vardion |
| 2002/0162782 A1 | 11/2002 | Maxwell |
| 2002/0166805 A1 | 11/2002 | Minns et al. |
| 2002/0185008 A1 | 12/2002 | Anderson et al. |
| 2002/0185454 A1 | 12/2002 | Beard et al. |
| 2003/0019805 A1 | 1/2003 | Fritze |
| 2003/0019819 A1 | 1/2003 | Fritze |
| 2003/0196947 A1 | 10/2003 | Gundrum et al. |
| 2003/0226800 A1 | 12/2003 | Brown et al. |
| 2004/0084360 A1 | 5/2004 | Janik |
| 2004/0084361 A1 | 5/2004 | Janik et al. |
| 2004/0084362 A1 | 5/2004 | Janik |
| 2004/0084363 A1 | 5/2004 | Janik |
| 2005/0056582 A1 | 3/2005 | Patel et al. |
| 2005/0103692 A1 | 5/2005 | Stanhope et al. |
| 2005/0161386 A1 | 7/2005 | Gustafson et al. |
| 2005/0194317 A1 | 9/2005 | Ikeyama et al. |
| 2006/0016769 A1 | 1/2006 | Hacker et al. |
| 2006/0037908 A1 | 2/2006 | Parkins, Jr. |
| 2006/0054547 A1 | 3/2006 | Richmond et al. |
| 2006/0060512 A1 | 3/2006 | Astle et al. |

(56) References Cited

U.S. PATENT DOCUMENTS

| | | | |
|---|---|---|---|
| 2006/0096934 A1 | 5/2006 | Weinberger et al. | |
| 2006/0118475 A1 | 6/2006 | Girondi | |
| 2006/0124516 A1 | 6/2006 | Merritt et al. | |
| 2006/0151371 A1 | 7/2006 | Weinberger et al. | |
| 2006/0180539 A1 | 8/2006 | Wolf et al. | |
| 2006/0186031 A1 | 8/2006 | Fick et al. | |
| 2006/0191836 A1 | 8/2006 | Dworatzek et al. | |
| 2006/0219621 A1 | 10/2006 | Dworatzek | |
| 2006/0219626 A1 | 10/2006 | Dworatzek et al. | |
| 2007/0034560 A1 | 2/2007 | Janik et al. | |
| 2007/0056888 A1 | 3/2007 | Williams et al. | |
| 2007/0108119 A1 | 5/2007 | Mandt et al. | |
| 2007/0114170 A1 | 5/2007 | Krull et al. | |
| 2007/0125179 A1 | 6/2007 | Janik et al. | |
| 2007/0187316 A1 | 8/2007 | Weinberger et al. | |
| 2007/0215561 A1 | 9/2007 | Yates et al. | |
| 2007/0227959 A1 | 10/2007 | Sinur et al. | |
| 2008/0142426 A1* | 6/2008 | Greco | B01D 29/15 210/234 |
| 2008/0245719 A1* | 10/2008 | Beard | B01D 36/003 210/235 |
| 2008/0264850 A1 | 10/2008 | Amesoder et al. | |
| 2008/0314819 A1 | 12/2008 | Ferreira et al. | |
| 2009/0078626 A1 | 3/2009 | Krull et al. | |
| 2009/0321340 A1 | 12/2009 | Rampen et al. | |
| 2010/0155321 A1 | 6/2010 | Sasur et al. | |
| 2011/0017649 A1 | 1/2011 | Sasur | |
| 2011/0272340 A1 | 11/2011 | Sasur et al. | |
| 2012/0037556 A1 | 2/2012 | Beard et al. | |
| 2013/0081990 A1* | 4/2013 | Roesgen | B01D 35/005 210/232 |
| 2013/0256206 A1 | 10/2013 | Thalmann et al. | |
| 2013/0298702 A1 | 11/2013 | Lam et al. | |
| 2014/0197087 A1 | 7/2014 | Pribanic et al. | |
| 2014/0231336 A1 | 8/2014 | Pribanic et al. | |
| 2014/0305858 A1 | 10/2014 | Downs et al. | |
| 2015/0090651 A1 | 4/2015 | Kotale et al. | |
| 2015/0090653 A1 | 4/2015 | Kotale et al. | |
| 2016/0023133 A1 | 1/2016 | Sasur et al. | |
| 2016/0271533 A1* | 9/2016 | Honermann | B01D 35/16 |
| 2019/0217229 A1* | 7/2019 | Rookey | B01D 35/30 |

FOREIGN PATENT DOCUMENTS

| | | |
|---|---|---|
| CN | 104645681 A | 5/2015 |
| CN | 105899271 A | 8/2016 |
| CN | 205654917 U | 10/2016 |
| EP | 0 880 987 A1 | 12/1998 |
| EP | 0 890 385 A2 | 1/1999 |
| EP | 1 188 469 A1 | 3/2002 |
| EP | 1690581 A1 | 8/2006 |
| FR | 2883198 A1 | 9/2006 |
| JP | 9173717 A | 7/1997 |
| JP | 10-184482 | 7/1998 |
| JP | 10-249109 | 9/1998 |
| JP | 3653837 B2 | 6/2005 |
| JP | 5525603 B2 | 6/2014 |
| KR | 20-1990-0006356 U | 4/1990 |
| WO | WO 02/078816 A1 | 10/2002 |
| WO | WO 2006/091557 A2 | 8/2006 |
| WO | WO 2006/120241 A2 | 11/2006 |
| WO | WO 2007/053228 A2 | 5/2007 |
| WO | WO 2009/117564 A1 | 9/2009 |
| WO | WO 2018/222804 A2 | 12/2018 |

OTHER PUBLICATIONS

"Machine Translation of CN205654917U", Xuan, published Oct. 19, 2016, 18 total pages. (Year: 2016).*

Dahl Baldwin, Marine Diesel Fuel/Water Separators, Installation pamphlet, 2005, 9 pages, pp. 1-9; Baldwin Filters, Inc. Kearney, Nebraska.

* cited by examiner

FILTER ELEMENT WITH TORSION LOCK AND/OR SLIDING PISTON, ASSEMBLY AND METHODS

CROSS-REFERENCE TO RELATED PATENT APPLICATIONS

This patent application is a continuation of PCT/US2018/035286, filed May 31, 2018, which claims the benefit of U.S. Provisional Application No. 62/513,214, filed May 31, 2017, the entire teachings and disclosure of which are incorporated herein by reference thereto.

FIELD OF THE INVENTION

The present application is generally directed towards liquid filters and liquid filter assemblies, and more particularly directed toward torsion locking detent arrangements, pressurization arrangements, and/or filter cartridge construction configurations in such liquid filters and liquid filter assemblies.

BACKGROUND OF THE INVENTION

Liquid filters such as oil filters or fuel filters are well-known in the art. Such liquid filters often are in the form of a cartridge that comprise upper and lower housing members that are joined together to form a filter housing and enclose filter media therein. Such liquid filter examples include the following U.S. patent publications: U.S. Pub. No. 2015/0090653 entitled Fuel Filter Cartridge and Method of Construction Thereof; U.S. Pat. No. 9,067,156 entitled Filter Cartridge Assembly and Method of Manufacture Therefor; U.S. Pat. No. 6,755,308 entitled Filter Cartridge with Grommet Springs; U.S. Pub. No. 2004/0084363 entitled Filter Cartridge Incorporating a Peripheral Compatibility Matrix; U.S. Pub. No. 2004/0084362 entitled Eccentric Interface Retention System for a Filter Cartridge; U.S. Pub. No. 2004/0084361 entitled Base Receptacle with a Fixed Retainer for Filter Cartridge Incorporating a Peripheral Compatibility Matrix; U.S. Pub. No. 2002/0014452 entitled Ecological Fuel Filter Cartridge and Element; U.S. Pat. No. 6,187,188 entitled Filter Cartridge Retention System; U.S. Pat. No. 5,837,137 entitled Base/Cartridge Location and Key System for Fuel Filter Assembly; U.S. Pat. No. 5,766,463 entitled Fuel Filter Cartridge; U.S. Pat. No. 5,474,676 entitled Filter Base Assembly; and U.S. Pub. No. 2009/0078626 entitled Filter Cartridge Housing Attachment Systems. These patent records are assigned to the present assignee or an affiliate thereof. As shown therein, these fuel filters often include a filter housing comprising an upper member and a lower member that are joined together either permanently or removably to enclose filter media therein. In some of these, two metal cans are connected by a roll seam to form a filter housing, and then the filter housing of the filter cartridge may be then attached by a separate collar member of a filter head to a filter head mounting base. In other such situations, there can be a filter thread on the filter cartridge itself that allows for twisting rotational movement of the filter to attach to a filter head.

In the instances where twisting of the filter is implemented using such a thread on the filter, it is desirable to prevent the filter from backing off or becoming detached from the filter head. Accordingly, in an attempt to provide such a filter, reference can be made to U.S. Pat. No. 8,057,669 entitled Filter Element and Filter Assembly Including Locking Mechanism (also assigned to the present assignee or an affiliate thereof) including certain embodiments thereof such as at FIGS. 64-66 for example that show a filter cartridge that includes a lower member that includes a thread and an upper member that includes a torsion lock detent. The lower member and the upper member are keyed and clocked at a predetermined orientation by way of keys at a keyed interface between these two components. The upper member comprises torsion lock detents. To connect the upper and lower members together, the filter includes an outer ridge forming an upright vertically and axially extending wall that supports an external seal member. The external seal member engages with the filter head base and prevents fluid from passing between the outer periphery of the cover and the inner surface of the sidewall of the lower housing member.

While the construction with locking detents such as shown in U.S. Pat. No. 8,057,669 provides certain benefits, such as positive torsion locking, improvements such as summarized in the summary section below are presented herein. Further other inventive aspects are also presented herein.

BRIEF SUMMARY OF THE INVENTION

One unique aspect is directed toward a filter cartridge comprises a moveable piston member. For example, the filter cartridge can comprise a canister having an open end and a second canister end opposite the open end. The piston is carried by the canister. The piston provides a cap capping the open end to provide a filter chamber in the canister. The piston has a range of sliding movement relative to the canister. An inlet port through the open end is provided through the piston for receiving unfiltered fluid, and an outlet port is also through the open end for returning filtered fluid. A filter media extends in the filter chamber and along a fluid flow path that extends from the inlet port to the outlet port with the filter media being arranged in fluid series between the inlet port and the outlet port.

In a particular embodiment, a torsion lock detent arranged on the piston and thereby movable relative to the canister.

In a particular embodiment, the piston comprises an external circular face and an outer peripheral surface surrounding the external circular face. The outer peripheral surface is slidably disposed along an inner peripheral surface of the canister. The torsion lock detent comprises at least one depression formed into the external circular face.

For example, in an embodiment, the at least one depression can be in the form of a wedge.

In a particular embodiment, a spring member is in the canister, with the spring member arranged to bias the piston away from the second canister end.

In a particular embodiment, a catch is provided at the open end and retains the piston to the canister. A spring member urges the piston in abutment with the catch. The piston has an outer annular surface in sliding contact with an inner annular surface of the canister.

In an example, the catch comprises a slot configuration for axially retaining the piston, slot configuration being defined along the inner annular surface. Another example includes a snap mechanism retention for the catch or other such examples as disclosed.

For example the slot configuration in an embodiment can comprise: a first axially extending slot portion defined extending through a terminating edge of the canister at the open end; a second axially extending slot portion in spaced relation to the first axially extending slot portion, with the canister defining an abutment stop portion between the terminating edge and the second axially extending slot portion; and a radially extending slot portion connecting the first axially extending slot portion and the second axially extending slot portion in axial spaced relation from the terminating edge. Further, the piston can comprise a retention tab slidable in the slot configuration. The retention tab can be installed through the first axially extending slot portion, along the radially extending slot portion and into the second axially extending slot portion with the abutment stop portion arranged to stop the retention tab in the second axially extending slot portion thereby to axially retain the piston to the canister.

In a particular embodiment, the catch comprises a stake arranged to restrain the piston axially or rotationally thereby to axially retain the piston to the canister with the catch.

In a particular embodiment, a mounting thread is provided by the canister.

In a particular embodiment, the cartridge comprises an filter element including the filter media. The filter element is positioned in the canister and comprises: a ring of filter media having a first media end and a second media end; a first end cap sealingly bonded to the first media end and positioned in spaced relation to the piston, wherein a fluid flow path is provided between the first end cap and the piston; and a second end cap sealingly bonded to a second media end of the ring of filter media.

In a particular embodiment, an annular spring chamber defined between the first end cap and the piston. A coil spring is arranged in the annular spring chamber and biases the piston away from the filter element.

In a particular embodiment, the first end cap is an open end cap and comprises a ring portion for sealingly bonding to the first end and a snout extending axially from the ring portion. The snout provides the outlet port and extends through the piston. The piston defines a central piston opening surrounding the snout and defines the inlet port.

In a particular embodiment, a radially outward directed radial seal is positioned on the snout; with a radially inward directed radial seal positioned along the central piston opening.

In a particular embodiment, the canister defines an annular seating surface, with a plurality of locating fins being along an outer periphery of the first end cap. The locating fins are seated on the annular seating surface.

In a particular embodiment, a ring gasket seals between an outer peripheral surface of the piston and inner peripheral surface of the canister.

Another unique aspect is directed toward a filtration assembly including a filter cartridge. Such an assembly comprises a filter head removably connected to the filter cartridge. The filter head comprises: a base portion and an annular rim portion. The base portion comprises an unfiltered inlet and a filtered outlet, with the unfiltered inlet in fluid communication with the inlet port of the filter cartridge upstream of the filter media, the filter outlet in fluid communication with the outlet port of the filter cartridge downstream of the filter media. The rim portion receives the filter cartridge with a threaded connection between the annular rim portion and the filter cartridge, with the piston of the cartridge arranged to axially abut the base portion.

In a particular embodiment, the filter cartridge and filter head are configured and arranged such the piston axially abuts the base portion with a force of at least 200 pounds when the filter cartridge is pressurized to a pressure point of at least 2 Bar and not greater than 6 Bar, thereby making the filtration assembly a rigid body to achieve a natural frequency of greater than 200 Hz at the pressure point.

In a particular embodiment, first and second interlocking torsion lock detents are provided on the base portion and the piston, respectively.

In a particular embodiment, the first torsion lock detent on the base portion is a fixed stationary projection.

For example, the second torsion lock detent on the piston can be in the form of a depression, and wherein a spring urges the piston axially toward the base portion, with the spring providing a force of between 50 and 100 pounds.

In a particular embodiment, the filter head comprises an outer cylindrical wall and an inner cylindrical wall providing for a fluid interface. Within the filter head, the unfiltered inlet is ported to a fluid annulus defined between the outer cylindrical wall and the inner cylindrical wall, and the filtered outlet is ported to a central cavity defined within the inner cylindrical wall.

In a particular embodiment, in an installed condition, the piston is received in an annular receptacle region defined between the outer cylindrical wall and the annular rim portion of the filter head. The piston has a gasket engaging the outer cylindrical wall. Further the filter cartridge can comprise an internal filter element providing the filter media and contained in the canister with the internal filter element having a snout extending through the piston and having a gasket engaging the inner cylindrical wall of the filter head.

Another unique aspect is also directed toward a method of using a filter cartridge with a filter head, comprising: twisting the filter cartridge to securing the filter cartridge to the filter head; engaging corresponding first and second torsion lock detents provided respectively on the filter head and the filter cartridge during the twisting engagement; and pressurizing the filter cartridge with liquid to pressurize a movable piston on the filter cartridge with the movable piston applying an axial force against the filter head.

In a particular embodiment, the method further comprises moving the second torsion lock detent provided on the filter cartridge relative to a remainder of the filter cartridge during the twisting engagement to provide for torsion locking between the filter head and the filter cartridge.

In a particular embodiment, such a moving step is by way of the movable piston on the filter cartridge, with the filter cartridge including a spring urging the movable piston and thereby the second torsion lock detent toward the filter head. The method may further comprise disengaging the first and second torsion lock detents to allow the filter cartridge to be removed from the filter head with a torque of between 2 and 12 foot-pounds applied to the filter cartridge.

In a particular embodiment, such pressurizing can generate a pressure of at least 2 Bar to in turn generate a force of at least 200 pounds between the filter cartridge and the filter head.

Another inventive aspect is directed toward unique torsion lock arrangement on a filter cartridge. The filter cartridge can comprise a filter housing including a first end and a second end and an annular sidewall extending therebetween, with the first end including a first annular end wall. A fluid flow interface is at the first end, with the fluid flow interface including an inlet port for receiving unfiltered fluid and an outlet port for returning filtered fluid. A thread is provided by the filter housing. A filter media is arranged in the filter housing and along a fluid flow path through the filter housing from the inlet port to the outlet port with the filter media being arranged in fluid series between the inlet port and the outlet port. A torsion lock detent is arranged at the first end, with the torsion lock detent being in the form of at least one depression formed into the first annular end wall.

In a particular embodiment, each at least one depression comprises a working surface region that includes maximum circumferential thickness of between 3 and 11 millimeters, and a radial span of between 2 and 23 millimeters, an axial depth of between 2 and 10 millimeters.

In a particular embodiment, at least 3 of the at least one depression are provided in angular spaced relation around the first annular end wall.

Such a filter cartridge can be used with a filter head having a corresponding torsion lock detent. The filter cartridge can further comprise flat regions defined along the first annular end wall and circumferentially between adjacent depressions. The flat regions can have the corresponding torsion lock detent ride therealong when in use during threaded attachment and guide installation into the adjacent depressions.

In a particular embodiment, each of the at least one depression is in the form of a wedge recess projecting toward the second end.

In a particular embodiment, the filter housing comprises a baseplate and a canister secured together, with the canister providing the thread and the baseplate providing the torsion lock detent.

In a particular embodiment, the baseplate is secured in a predetermined angular orientation with the canister to clock the thread relative to the torsion lock detent.

In a particular embodiment, the baseplate is slidably retained to the canister and axially movable relative to the canister over an axial movement range, whereby the torsion lock detent is movable relative to the thread. The axial movement range of the baseplate is limited by a catch on the canister that axially retains the baseplate to the canister.

In a particular embodiment, a filter element contains the filter media. The filter element arranged in the filter housing with a spring acting upon the filter element and the baseplate such that the baseplate is moveable relative to the canister through extension or compression of the spring.

In a particular embodiment, the spring is in a compressed state proximate the first end and compressed axially between the filter element and the baseplate.

Another aspect is directed toward catch retention in a torsion locking filter cartridge. The cartridge comprises a filter housing including a baseplate and a canister, wherein the baseplate is slidably retained to the canister and axially movable relative to the canister over an axial movement range. A catch on by the canister axially retains the baseplate to the canister, with the catch arranged to prevent removal of the baseplate from the canister. A fluid flow interface is through the housing, the fluid flow interface including an inlet port for receiving unfiltered fluid and an outlet port for returning filtered fluid. A thread is provided by the canister. A filter media is arranged in the filter housing and along a fluid flow path through the filter housing from the inlet port to the outlet port with the filter media being arranged in fluid series between the inlet port and the outlet port. A torsion lock detent is provided on the baseplate, whereby the torsion lock detent is movable relative to the thread, with the axial movement range being limited by the catch.

In a particular embodiment, a spring is carried by the filter housing, with the spring acting upon the baseplate and urging the baseplate toward the cartridge.

In a particular embodiment, the axial movement range is limited by first and second first and second axial stops that are axially spaced, with the catch providing the first axial stop.

In a particular embodiment, the catch comprises a slot configuration for axially retaining the baseplate. Such a slot configuration may be those examples as described herein.

In a particular embodiment, the catch can comprises a stake arranged to restrain the piston axially or rotationally thereby to axially retain the piston to the canister with the catch.

In a particular embodiment, an axial movement range is limited to a span of between 4 and 15 millimeters (more typically between 5 and 10 in a preferred embodiment).

In a particular embodiment, a filter cartridge has a new housing cap retention aspect. Such a cartridge can comprise a canister having an open end and a second canister end opposite the open end and a cap capping the open end to provide a filter chamber in the canister. An inlet port is through the open end for receiving unfiltered fluid provided through the cap and an outlet port through the open end for returning filtered fluid. Filter media extends in the filter chamber and along a fluid flow path that extends from the inlet port to the outlet port with the filter media being arranged in fluid series between the inlet port and the outlet port, A catch is provided at the open end and retains the cap to the canister. The catch comprises at least one member selected from the group comprising: a stake formed into canister, a stake attached to canister, and a resilient snap formed into the canister. Such a catch member is arranged to restrain the cap so that the catch axially retains the cap to the canister.

In a particular embodiment the canister is plastic.

In a particular embodiment, the at least one catch member is in the form of the stake formed into the canister, with the stake comprising a thermally deformed stake projection formed into the canister.

In a particular embodiment, the catch comprises a slot configuration for axially retaining the cap, with slot configuration being defined along the inner annular surface and comprising, the slot configuration extending toward a terminating edge of the canister such that the cap comprises a retention tab slidable in the slot configuration. The thermally deformed stake projection extends into the slot configuration and traps the retention tab in the slot configuration.

In an example, the slot configuration comprises an axially extending slot having a slot bottom, with the retention tab being trapped between the thermally deformed stake projection and the slot bottom. The thermally deformed stake projection is formed into the axially extending slot.

In another example, the slot configuration comprises: (a) a first axially extending slot portion defined extending through a terminating edge of the canister at the open end; (b) a second axially extending slot portion in spaced relation to the first axially extending slot portion, the canister defining an abutment stop portion between the terminating edge and the second axially extending slot portion; and (c) a radially extending slot portion connecting the first axially extending slot portion and the second axially extending slot portion in axial spaced relation from the terminating edge. The retention tab is installable through the first axially extending slot portion, along the radially extending slot portion and into the second axially extending slot portion with the abutment stop portion arranged to stop the retention tab in the second axially extending slot portion thereby to axially retain the cap to the canister.

In such an example, the thermally deformed stake projection can be formed into the radially extending slot portion.

In a particular embodiment, a mounting thread is provided by the canister.

In a particular embodiment and another, the at least one catch member is in the form of the resilient snap formed into the canister.

In such a resilient snap example, the at least one catch member comprises a plurality of finger projections formed at a terminating end of a solid ring portion of the canister and extending axially therefrom. The finger projections are radially flexible inwardly and outwardly and including a cam install surface facing away from the solid ring portion and a catch ledge facing toward the solid ring portion. The cap has an outer perimeter configured to engage with the cam install surface. The catch ledge is adapted to facilitate snap action installation and retention.

In a particular embodiment, a spring member in the canister urges the cap toward abutment with the catch In such examples, the cartridge can have an filter element including the filter media, wherein the filter element is positioned in the canister and comprises: a ring of filter media having a first media end and a second media end; a first end cap sealingly bonded to the first media end and positioned in spaced relation to the piston, wherein a fluid flow path is provided between the first end cap and the cap; and a second end cap sealingly bonded to a second media end of the ring of filter media.

Other aspects, objectives and advantages of the invention will become more apparent from the following detailed description when taken in conjunction with the accompanying drawings

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
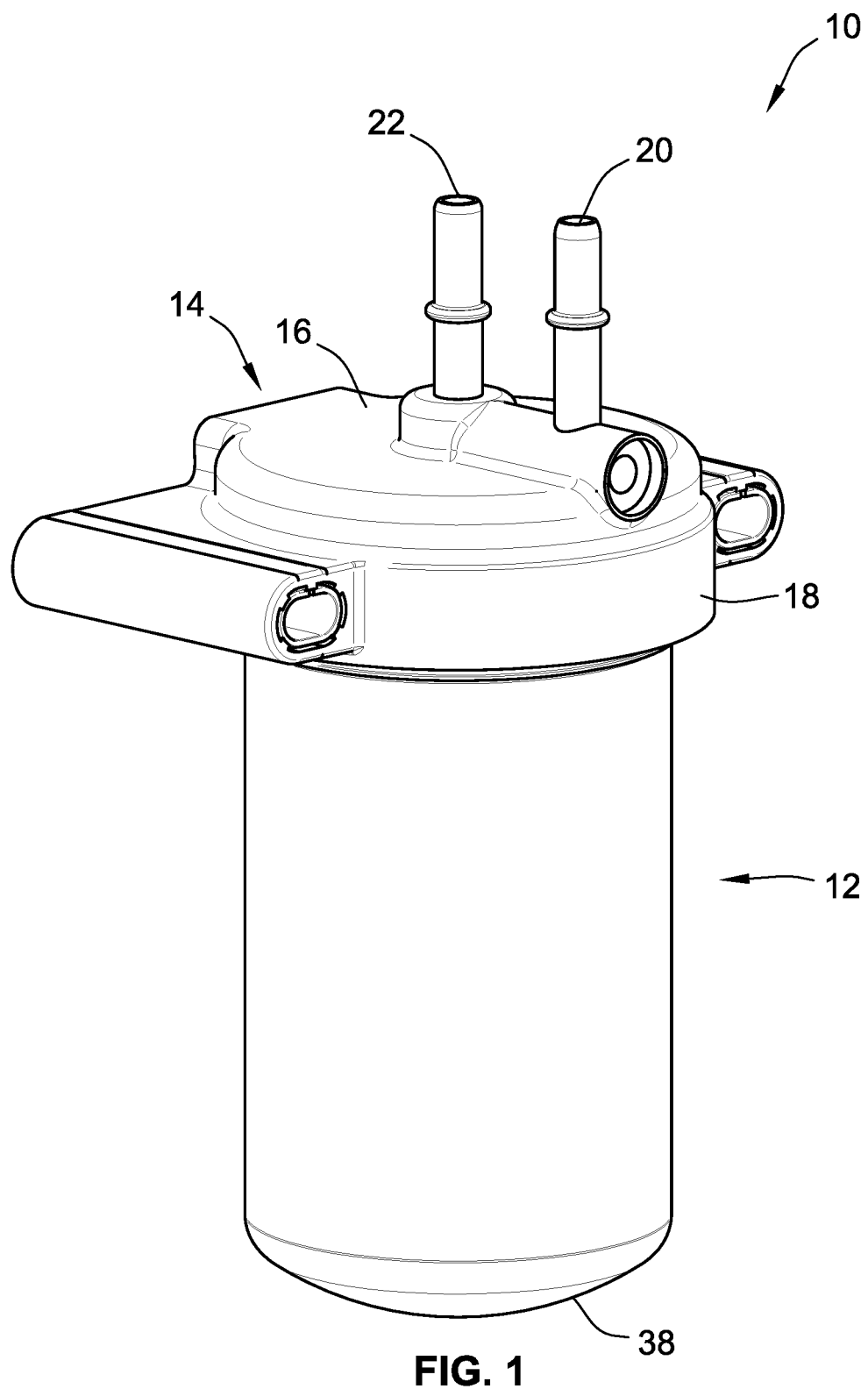
FIG. 1 is an isometric view of a filtration assembly including a filter cartridge and a filter head according to a first illustrated embodiment.
Figure 2:
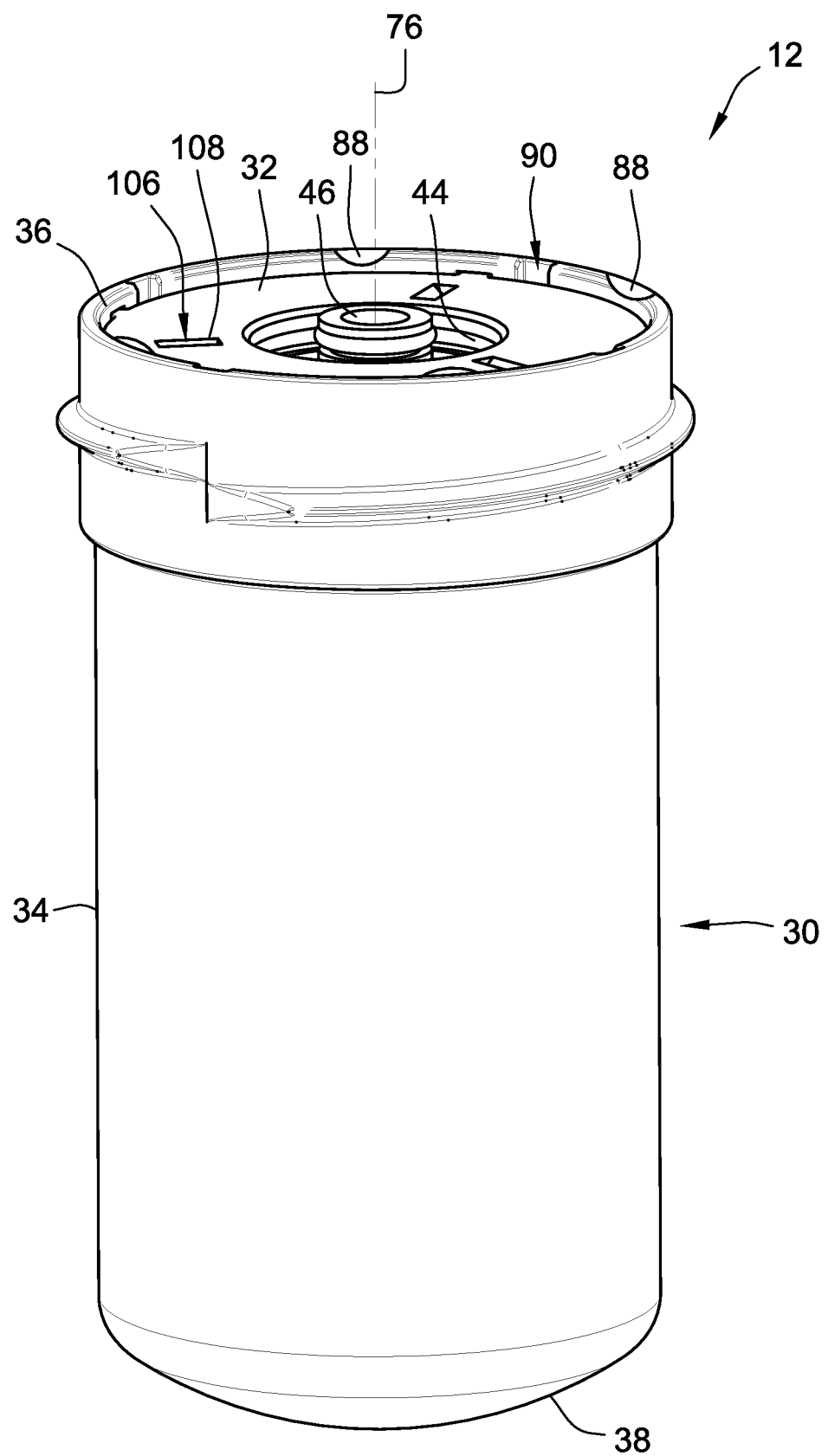
FIG. 2 is an isometric view of the filter cartridge alone employed in the filtration assembly shown in FIG. 1, with thermally deformed stakes as a catch mechanism for axial piston retention being partly schematically illustrated.
Figure 3:
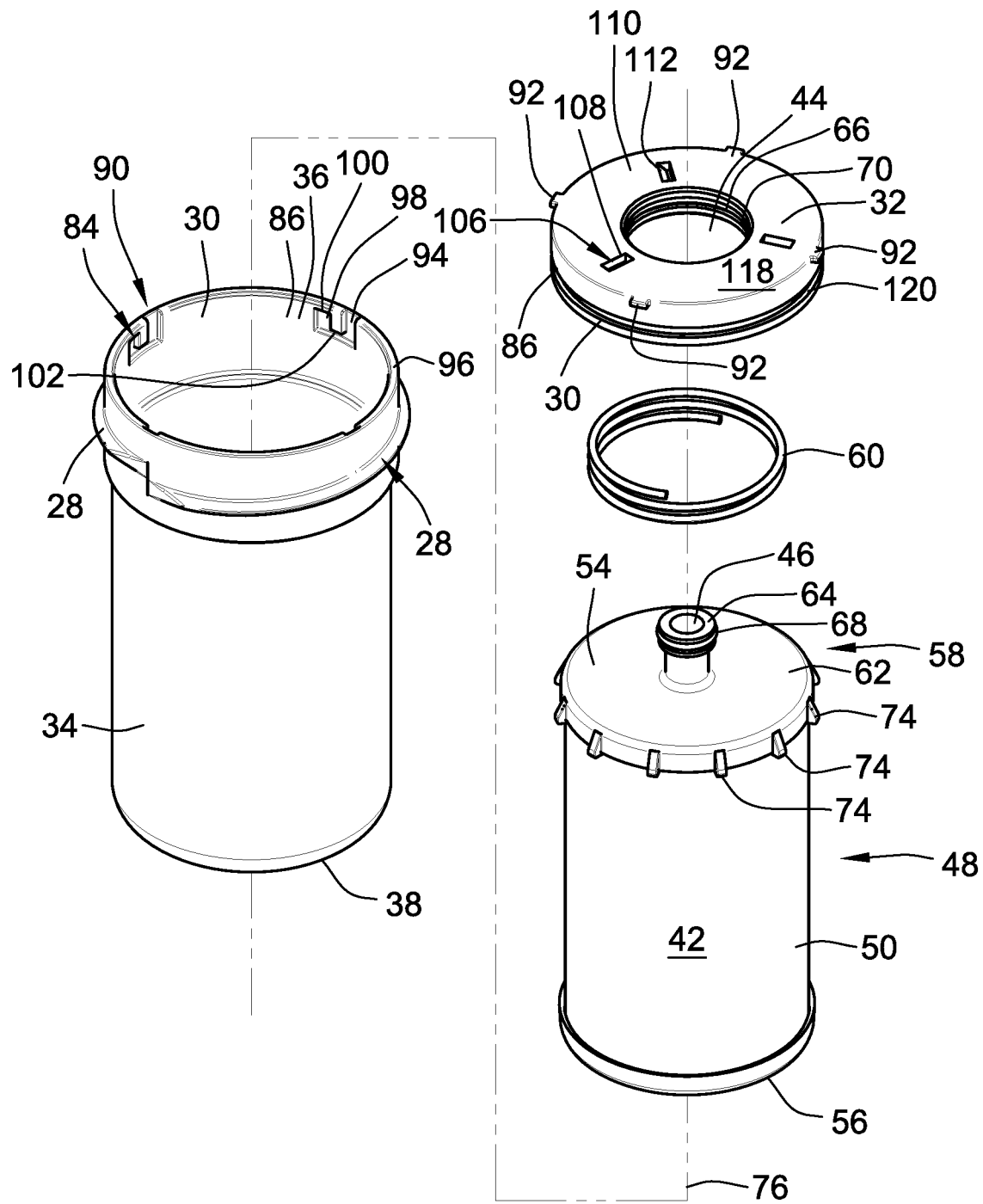
FIG. 3 is an exploded isometric assembly view of the components of the filter cartridge shown in FIG. 2.
Figure 4:
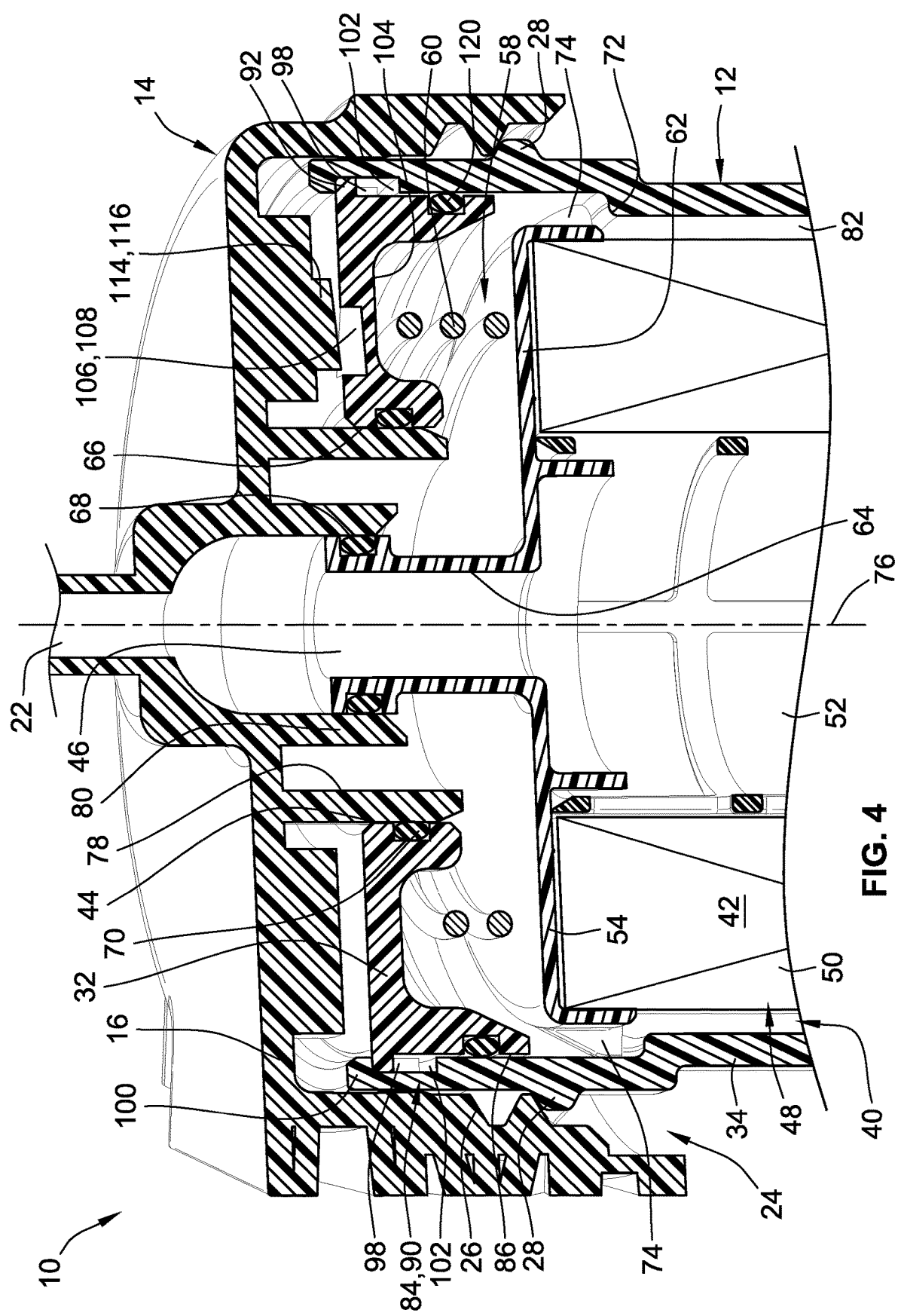
FIG. 4 is a cross-section taken vertically through the filtration assembly shown in FIG. 1 and through the central axis thereof, with the filter cartridge shown in a position received but not yet inserted into the filter cartridge in a state just before twisting attachment.
Figure 5:
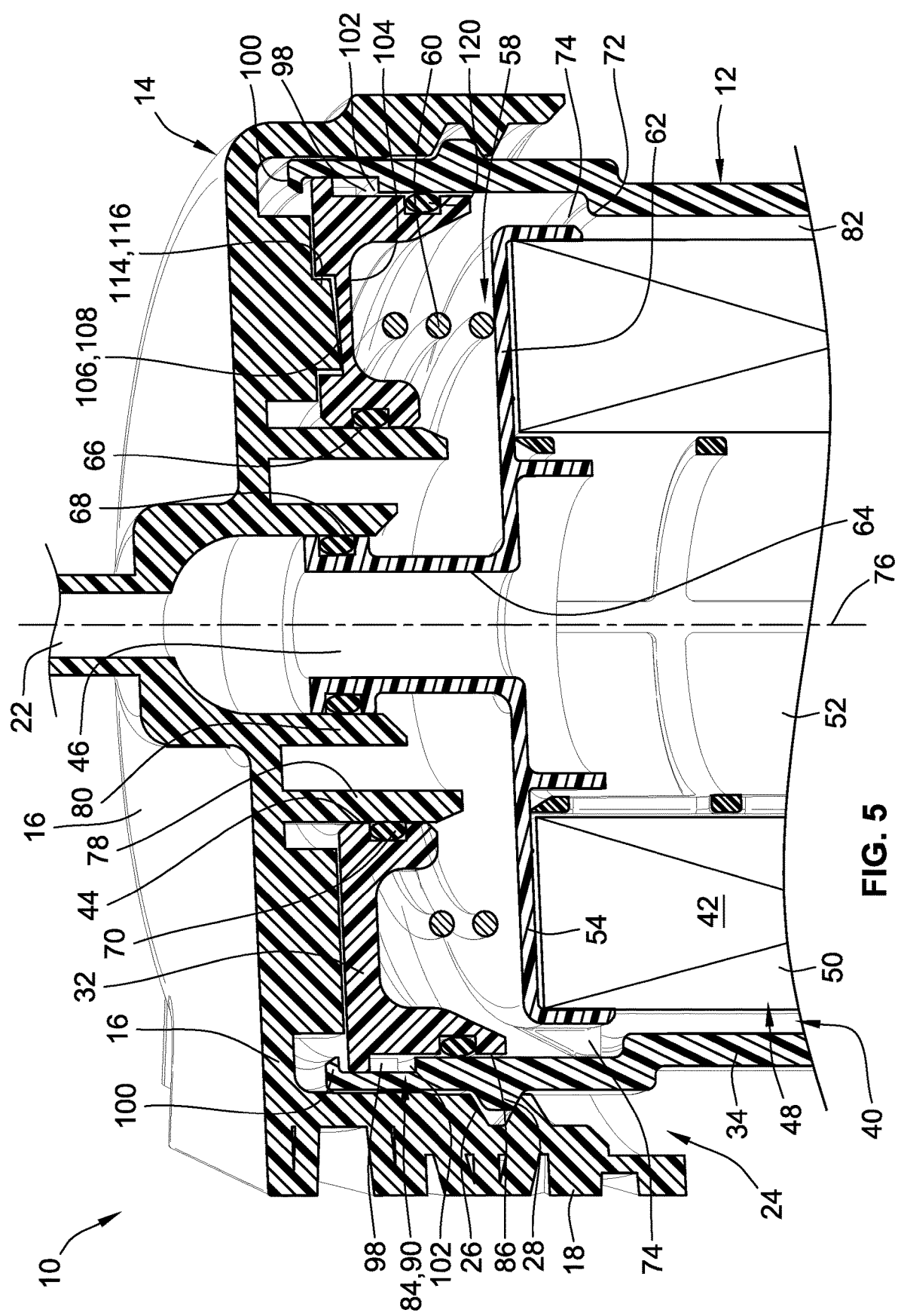
FIG. 5 is another cross-section taken along a different plane relative to FIG. 4, but also a vertical cross-section and along the central axis through the filtration assembly shown in FIG. 1, and shown in a different state than FIG. 4 with the filter cartridge now inserted into the filter head, with torsion locking engagement torsion locking the filter cartridge to the filter head.

Turning to FIGS. 1-5, an illustrated embodiment of the present invention has been shown as a filtration assembly 10 including a filter cartridge 12 that is removably connected to a filter head 14 through a twist lock connection. This filtration assembly, including the filter cartridge thereof, provides several features which may be used separately or in combination as described below, including torsion locking to prevent inadvertent detachment of the filter cartridge 12 from the filter head 14, filter cartridge pressurization to increase axial load between the filter cartridge 12 and the filter head to provide axial force acting upon the threads between the filter head and filter cartridge to provide rigidity and a higher first natural frequency. The cartridge 12 may also include an improved torsion lock detent feature such as providing for movement of the torsion lock detent on the filter cartridge as opposed to the filter head. Such various features that may be used independently or in combination will be discussed below To first provide a general overview of component parts, attention will first be had to general details of the filter head 14. As shown in FIGS. 1, 4-5, the filter head 14 generally comprises a base portion 16 and an annular rim portion 18 that projects from the base portion 16 at an outer periphery thereof. The base portion 16 comprises an unfiltered inlet 20 and a filtered outlet 22, each of which may be tubular connector fittings as shown that project from the body of the base portion 16 and that can be coupled to fluid hoses. For example, the inlet and outlet fittings may be connected to an inlet fuel hose to receive fuel coming from a fuel tank of an engine at the filtered inlet 20, and an outlet fuel hose leading from the filter outlet 22 to an engine for combustion. In this manner, the inlet 20 and the outlet 22 provide for liquid flow both into the filtration assembly 10 and out of the filtration assembly in use in an appropriate application such as a vehicle fuel filtration system.

In the filter head 14, the rim portion and the base portion together define a cylindrical receptacle 24 that is sized to receive an upper end of the filter cartridge 12 as illustrated. The rim portion includes a thread including, for example, a pair of receiving threads 26. As illustrated, these receiving threads 26 may be formed as thread grooves defined along the inner periphery of the annular rim portion 18. These receiving threads 26 provide a thread ramp and thereby are adapted and configured to receive a corresponding thread of the filter cartridge 12. For example, in this embodiment a pair of projecting threads 28 are provided by and along the outer surface of the filter cartridge 12 to provide such a filter cartridge thread. Engagement between the receiving threads 26 and the projecting threads 28 serve to axially retain the filter cartridge 12 to the filter head 14 and facilitate twisting engagement and disengagement between the filter head and the filter cartridge. Preferably, more than one thread is provided in angular spaced relation that can result in a ½-turn-type element as shown, although it is envisioned that the filter cartridge may be a ⅓ turn, a ¼ turn, or a ¾ turn, but preferably less than 360° of twisting movement in a more preferred embodiment.

Turning to some general details of the filter cartridge, it is seen that the filter cartridge 12, as illustrated in FIGS. 2-3, generally includes a filter housing 30 that includes a pair of opposite first and second ends and a cylindrical sidewall extending between the opposite ends. For example, the filter housing in the illustrated embodiment are provided by a baseplate 32 and a canister 34, which provide upper and lower housing members. The canister 34 has an open end 36 and a second canister end 38 opposite the open end. The second canister end, is preferably closed such as by a dome wall as illustrated, but alternatively may include an opening such as to facilitate attachment to a water collection bowl (not shown) or a drain cock valve (not shown).

The baseplate 32 (also referred herein as a piston), provides a cap that caps the open end 36 of the canister 34. The canister and/or filter housing defines a filter chamber 40 therein which can house suitable filter media 42 for fluid filtration purposes.

To provide for fluid connection with the filter head 14, a fluid flow interface is also provided through the filter housing including an inlet port 44 and an outlet port 46. The inlet port 44 ports through the open end for receiving unfiltered fluid. Similarly, the outlet port 46 is ported through the open end for returning filtered fluid to the filter head.

The filter media 42 is disposed in series along the fluid flow path that extends from the inlet port 44 through the filter chamber 40 and to the outlet port 44 such that liquid flowing from the inlet port to the outlet port is caused to be routed through the filter media for filtration to remove unwanted contaminants such as particulates and/or water droplets for example in the case of fuel filtration.

Typically, the filter media 42 is provided by a filter element 48 that can be separate from the filter housing if desired as illustrated. For example, the filter media is shown to be contained within the canister 34 and enclosed by the baseplate 32 and non-removably housed within filter chamber 40.

In a more typical embodiment, the filter element may include a tubular ring 50 of the filter media 42 with a first annular media end and a second annular media end. Often the ring 50 of filter media 42 is a pleated ring and may be cylindrical in shape. In this manner, the ring 50 of the filter media defines an internal clean chamber 52. The media ends are capped. For capping, the filter element 48 can comprise a first end cap such as an open end cap 54 at the first media end and a second end cap such as a closed end cap 56 at the second media end. The respective end caps 54, 56 are sealingly bonded to the respective media ends such as by way of potting with suitable adhesive such as plastisol in corresponding potting wells provided at opposite ends or via a direct embed process into the caps, or other appropriate method.

While in the illustrated embodiment and as preferred, the filter element 48 is contained fully within the filter housing 30, alternatively, in some embodiments, the first end cap such as open end cap 54 may form the baseplate or be part of the baseplate 32 to provide for torsion locking, and thereby form part of the filter housing. For example, the baseplate 32 and the open end cap 54 could be combined into one element to provide for the cap of the filter housing 30 that caps the open end of canister, with the spring element (herein later described) positioned not at the open end but instead at the domed end of the canister and acting upon the bottom end of the filter element to facilitate the loading aspects.

Returning again to the illustrated embodiment with separate baseplate and filter element component parts, the filter cartridge 12 further comprises an annular spring chamber 58 that is defined between the open end cap 54 and the baseplate 32. Spring chamber 58 houses a spring such as a coil spring 60 (or alternatively a wave spring or other appropriate spring, herein spring includes suitable resilient members that apply biasing force). The spring 60 is disposed in the spring chamber 58 in a state of compression between the filter element 48 and the baseplate 32 urging and biasing the baseplate 32 away from the filter element 48 and thereby away from the second canister end 38 (e.g. away from the domed end as illustrated). In this manner, the baseplate 32 is moveable with and against the action of the spring and also can serve as a piston as alluded to above.

As to further filter element details, the open end cap 54 includes a ring portion 62 and a snout 64 extending from the ring portion and through a central opening 66 in the baseplate 32 to provide part of the fluid flow interface of the filter cartridge. Specifically, the snout 64 defines and provides for the outlet port 46 of the filter cartridge while the baseplate 32 and its central opening 66 that surrounds the snout 64 defines an annulus and defines the inlet port 44.

To prevent leakage bypass, a radially outward directed radial seal 68 is positioned on the snout 64, and a radially inward directed radial seal 70 is positioned along the central piston opening 66. Each of these seals 68, 70 may be provided by a separate O-ring gasket that is situated in a corresponding mounting groove provided on the snout 68 and central opening 66 as shown in FIGS. 3-5.

While the coil spring 60 urges the baseplate 32 upwardly as illustrated in the figures (e.g. according to the orientation used in the figures with baseplate at the top end as shown), the coil spring also urges the filter element downwardly toward the second canister end 38. The filter element 48 may bottom out on the second canister end 38, but more preferably, the canister defines an annular seating surface such as provided by a shoulder ledge 72 proximate the open end. Further, the open end cap 54 of the filter element 48 may include locating fins 74 along an outer periphery thereof. The locating fins 74 are seated on the annular seating surface provided by ledge 72 and thereby provide for axial supporting abutment between the filter element and the canister. This provides a platform or base for supporting the coil spring 60 so that it can act on the baseplate 32 and urge the baseplate away from both the filter element as well as the second canister end 38.

Further, the locating fins 74 are preferably angularly spaced at regular spacing around the internal filter element and serve to guide and concentrically locate the filter element 48 within the canister 34 relative to a central filter axis 78 to better align the inlet and outlet ports relative to corresponding structures on the filter head. Further the fins 74 extend radially to provide flow channels between adjacent fins to allow axial flow of fluid past the fins and along the outside of the filter element 48.

With this cartridge porting arrangement, the outlet port 46 and inlet port 44 of the filter cartridge 12 are arranged to sealingly interface with corresponding fluid flow interface structures on the filter head 14. For example, the filter head 14 comprises an outer cylindrical wall 78 and an inner cylindrical wall 80 that provide for the fluid flow interface of the head. Within the filter head, the unfiltered inlet is ported to a fluid annulus defined between the outer cylindrical wall 78 and the inner cylindrical wall 80 to thereby provide for porting of fluid to the inlet port 44 of the filter cartridge 12. Further, the filtered outlet 22 is ported to a central cavity defined within the inner cylindrical wall 80 to thereby provide for return of fluid from the outlet port 46 of the filter cartridge 12.

As can be seen, the corresponding seals 68, 70 of the filter cartridge engage with the corresponding inner cylindrical wall 80 and outer cylindrical wall 78 of the filter head to sealingly couple the cartridge inlet port 44 with the unfiltered inlet 20 and the cartridge outlet port 46 with the filtered outlet 22 of the filter head.

For example, it can be seen that the radial seal 68 carried by the snout 64 seals radially outwardly against the inner cylindrical wall 80, while the seal 70 carried by the central opening 66 of baseplate 32 sealingly engages radially inwardly against the outer cylindrical wall 78. During installation, the outer cylindrical wall 78 is received into the central opening 70 of the baseplate 32, while the snout 64 is received into the central cavity end of the inner cylindrical wall 80. This provides for fluid coupling and sealing between the filter head and the filter cartridge.

With a fluid connection, unfiltered fluid can enter through the unfiltered inlet 20 of the filter head 14, be routed through the inlet port 44 of the filter cartridge and into an outer cylindrical unfiltered chamber 82 formed radially between the canister 34 and the internal filter element 48. The unfiltered fluid at this point can flow radially through the ring 50 of filter media (which may be pleated filter media), and into the internal clean chamber 52, by which the unfiltered fluid becomes clean by passing through the filter media such that clean fluid is contained within the internal clean chamber 52. The internal clean chamber 52 is connected through the open end cap 54 and the snout 64 through the central opening thereof to return filtered fluid back to the filter head where in can be returned to the filtered outlet 22 of the filter head 14.

As mentioned, the baseplate 32 may also act as a piston with a range of axial sliding movement relative to the canister 34. This axial sliding movement is against the action of the spring 60 which is contained in the canister 34 as noted above. To counteract the axial force provided by the spring 60, the filter cartridge 12 can further comprise a catch 84 provided at the open end 36 that may take one of various forms. The spring 60 is arranged to urge the baseplate 32 to about the catch 84, thereby to axially retain the baseplate 32 to the canister 34 against the action of the spring 60. As can be seen, the baseplate has an outer annular surface in the form of a cylindrical surface in sliding contact with a corresponding inner annular surface and cylindrical inner surface of the canister. Such cylindrical sliding interface surfaces can generally be seen at reference number 86.

One form of a catch 84 is shown schematically in FIG. 2 can comprise a stake 88 that is arranged over an external axially outward face of the baseplate 32 to axially retain the baseplate 32 to the canister 34. For example, the stake 88 can be formed by thermally deforming such as ultrasonically deforming a portion of the canister 34 at the open end 36 over the baseplate 32. Alternatively, the stake may be some fastener, snap ring or other device that is attached at the open end 36 of the canister 34. In any event, such stake 88 can be permanent to in that extraordinary effort would be required to remove the baseplate 32 and the internal filter element 48. For example, if it is ultrasonically deformed, destruction of the stake such as breaking off the point would be required to remove those structures but in such instance, such a stake is considered nevertheless to be a permanent retention. Permanent retention is preferred to avoid inadvertent removal of the internal filter element 48 or inadvertent detachment of the baseplate 32.

Additionally, the catch 84 can also additionally or alternatively comprise a slot configuration for axially retaining the baseplate 32. Such a slot configuration 90 is shown in detail in FIG. 3, but also shown in FIGS. 4 and 5, with the slot configuration 90 arranged to interact with corresponding retention tabs 92 provided at the outer periphery of the baseplate 32.

For example, the slot configuration 90 may include a first axially extending slot portion 94 extending through a terminating edge 96 of the canister 34 at the open end. Further, the second axially extending slot portion 98 is provided in angularly spaced relation relative to the central axis 76 to the first axially extending slot portion 94. However, this second slot portion 98 does not extend through the terminating edge 96, but instead the canister 34 defines an abutment stop portion 100 between the terminating edge 96 and the second slot portion 98. Further, a radially extending slot portion 102 connects the first slot portion 94 and the second slot portion 98. This radial slot portion 102 is axially spaced from the terminating edge 96.

In this slot configuration 90, the retention tab 92 (typically multiple retention tabs 92 and corresponding slots at different angular locations, but for simplicity, one will be described) is installable through the first axially extending slot portion 96, can then bottom out into the radially extending slot portion 102. Then, the baseplate 32 can be rotated slightly relative to the canister to allow the retention tabs 92 to be received within the second axially extending slot portion 98 which axially retains the baseplate 32 within the canister 34. Specifically, the spring 60 will push the baseplate 32 until that the retention tabs 92 engage with the abutment stop portion 100, as is shown for example in FIG. 4.

For example, a force of between 50 and 100 pounds in an embodiment may be used to install the retention tabs 92 into the slot configuration 90. The force is preferably high enough to discourage disassembly, which is not necessary. Also for example, relative rotation of between 10 and 20 angular degrees about the central axis 76 can align the retention tabs 92 into the second slot portion for engagement with the stop portions 100.

The second slot portion 98 also accommodates a range of axial sliding movement of the baseplate 32 without becoming dislodged. With reference to FIG. 5, the baseplate 32 acts as a sliding piston that is movable against the action of the spring 60 such as by torsion lock detent contact during installation when that the retainer tabs 92 move within the range of axial sliding movement, preferably within the second slot portion 98 without being removed therefrom. Typically, that range of movement is between 10 and 15 millimeters for most embodiments, and sometimes between 6 and 10 millimeters, for more preferred embodiments.

Further, when the filter cartridge 12, is coupled and threaded connection to the filter head 14 as shown for example in FIG. 5, the baseplate 32 and the piston provided thereby do not bottom out on the corresponding catch 84, but instead are unseated therefrom and lifted off of the catch 84 such as provided by stakes 88 or the abutment stop portions 100. When the filter cartridge is pressurized with fluid, the baseplate 32 includes an internal working face 104 exposed to the fluid pressure contained within filter chamber 40 which thereby acts with the spring 60 to urge the piston into an axial abutting relation with the filter head 14. Thus, when the cartridge is pressurized, this provides axial force acting on the threads which can be several hundred pounds. This makes the filter head and filter cartridge together a rigid structure as the overall filtration assembly 10 to provide for the desirable natural frequency of greater than 200 Hz in an embodiment. The rigidity also makes it very difficult to remove the cartridge while the filtration assembly is pressurized in operation.

Additionally, the spring action can be utilized to facilitate the torsion locking action and allow corresponding torsion lock detent members on the filter head and the filter cartridge to snap into and out of engagement when aligned.

For example, the filter cartridge 12 is shown to include a corresponding torsion lock detent 106 that is arranged on the baseplate 32, and thereby the torsion lock detent 106 is readily movable relative to the canister 36. For example, the torsion lock detent 106 may comprise a projection but more preferably may be in the form of at least one depression 108 that is formed into an external circular face 110 on the baseplate 32 that faces the filter head 14.

For example, this external circular face 110 may be flat in an embodiment. Likewise, the rim or outer periphery of the canister at the open end is likewise flat in a preferred embodiment in furtherance of this aspect. These types of features allow the cartridge to be situated upside down and sit flat along a corresponding surface which is useful for a mechanic.

Most preferably, the torsion lock detent 106 may comprise multiple members of depressions 108 arranged at regular angular spacing about the central axis. For example, preferably at least three such depressions 108 are provided to provide for balancing of the torsion lock detent during installation and use. Preferably, these depressions 108 are in the form of a wedge with an angled cam surface 112 (e.g. a ramp surface along at least one side of the wedge) that can control the amount of force that is required when untwisting and releasing the filter cartridge from the filter head to overcome the action and force provided by the spring 60 which maintains or otherwise keeps the filter cartridge and torsion lock detent members in engagement. Cam surface 112 by being ramped can translate rotational force into axial force to move the baseplate 32.

To cooperate with the torsion lock detent 106 on the cartridge 12, the filter head 14 includes a corresponding torsion lock detent 114 in the form of axial projections 116 that project axially from the base portion 16 of the filter head 14 with in the cylindrical receptacle 24. For the filter cartridge 12 shown in FIG. 3 with three corresponding wedge depressions 108, three corresponding detent projections 116 are be provided on the filter head 14 in corresponding locations and at the same angular spacing. In this manner, the three detent projections 116 from the filter head 14 will be received in the corresponding wedge depressions 108 of the filter cartridge 112 that when engaged torsionally lock and prevent detachment of the filter cartridge from the filter head during operation, but that torsion locking can be overcome with sufficient rotational force applied by a service mechanic during filter replacement service intervals.

Considering that the spring force is provided in this instance by the spring 60 and that the torsion lock detent 106 of the cartridge is movable, there is no need for the detent projections 116 of the filter head to be movable such that the torsion lock detent on the base portion may be positioned in a fixed stationary position and non-movable relative to the base portion.

The filter head detent projections 116 may also have a corresponding wedge shaped configuration with a cam surface to also control the amount of force required to rotate the filter cartridge to overcome the spring force keeping the corresponding torsion lock detents 106, 114 in locking engagement.

With the external circular face 110 of the baseplate 32 being flat, flat regions 118 can be defined along the outer annular end wall provided by the overall filter housing and be circumferentially between the depressions 108. This provides a surface for the corresponding lock detent projections 116 of the filter head to ride along when in use and during threaded attachment. The filter head detent projections 116 may therefore slide along these flat regions 118 during attachment and detachment to facilitate engagement and disengagement.

Considering that the torsion lock detent 106 of the cartridge and the projecting threads 28 of the cartridge are provided by different component parts, the baseplate 32 is secured in a predetermined angular orientation with respect to the canister 34 in order to clock the projecting threads 28 relative to the torsion lock detent 106. In this fashion, when the cartridge 12 is attached to the filter head, at the end of movement, the torsion lock detent 106 of the cartridge will align with and engage (e.g. axially snap into) with the corresponding torsion lock detent 114 of the filter head 14. The axial snap action provides an audible indication to the service technician that the torsion locking has been accomplished.

To facilitate such keying relationship for appropriate clocking, the corresponding slot configuration 90 and retention tabs 92 are arranged at selected angular positions to provide for such clocking arrangement. Accordingly, the baseplate 32 is also rotationally fixed relative to the canister by virtue of the retention tabs 92 being constrained by the slot walls of the second axially extending slot portion 98.

Further, this filter cartridge 12 may be made incinerable with plastic support components, with the canister 34 being a plastic injection molded component and the baseplate 32 also being a plastic injection molded component. To facilitate sealing therebetween, a radial seal such as an O-ring gasket 120 is provided along the cylindrical sliding interface 86 provided between the baseplate and the canister. For example, in this embodiment, the baseplate 32 defines an outwardly facing groove that retains and holds the O-ring gasket 120 along this cylindrical sliding interface 86.

In operation, a mechanic will twist the filter cartridge 12 onto the filter head 14 to secure the filter cartridge to the filter head by having the projecting threads 28 engage with and be received into the corresponding receiving threads 26 of the filter head. The very start of this movement is illustrated for example in FIG. 4 that shows the baseplate 32 portion of the filter cartridge being just received into the cylindrical receptacle 24 of the filter head. During twisting movement, the threads 28 and 26 engage with each other with the cartridge moving spirally causing the filter head torsion lock detent projections 116 to slide along the flat regions 118 of the baseplate 32 until the filter head projections 116 align with and engage in the corresponding torsion lock detent 106 and wedge depressions 108 of the cartridge. During this twisting movement, the spring 60 is compressed and the baseplate is driven axially relative to the canister against the action of the spring. Upon release (e.g. alignment of detents), the baseplate 32 is lifted off of its corresponding catch 84 as shown in the mounted and attached state in FIG. 5.

In the mounted state in FIG. 5, axial abutment occurs between the baseplate 32 and the filter head 14 such that pressurization within the canister, as well as the spring force cause an axial force to be exerted upon the filter head which is then transferred to the corresponding threads 26, 28. This provides the structure as quite rigid such that when the engine is running the pressurization within the filter cartridge causes the filter cartridge to be locked in place and cannot be removed by hand.

In an example, the filter cartridge and the filter head are configured and arranged such the piston baseplate axially abuts the base portion with a force of at least 200 pounds when the filter cartridge is pressurized to a pressure point of at least 2 Bar and not greater than 6 Bar, thereby making the filtration assembly a rigid body to achieve a natural frequency of greater than 200 Hz at the pressure point. In other words, at a point above 2 Bar and a typical operating pressure, a natural frequency of greater than 200 Hz is achievable.

Further, when the system is not running and the filter cartridges then depressurize (e.g. the engine is not running), only the spring force is acting upon the baseplate which retains the torsion lock detent members in engagement and prevents detachment. However, the corresponding cam surfaces such as cam surface 112 of the wedge depression 108 are configured such that a service mechanic can overcome the torsion locking action if desired by rotating the filter and twisting and unlocking the filter cartridge 12 from the filter head 14. This is done at periodic filter replacement intervals and then a new cartridge also having corresponding torsion lock detent structures can then be attached.

In an example, a torque of between 2 and 12 foot-pounds applied to the filter cartridge (more typically between 2 and 4 foot-pounds) may be applied by a service mechanic to facilitate overcome the torsion locking and thereby detach the filter cartridge from the filter head. This often can be done manually by hand of the service mechanic without the need for spanner wrenches or other tools.

In an example, each detent wedge depression 108 comprises a working surface region that includes a maximum circumferential thickness of between 3 and 11 millimeters (more typically between 3 and 5 in a preferred embodiment), and a radial span of between 2 and 23 millimeters (more typically between 15 and 30 in a preferred embodiment), and an axial depth of between 2 and 10 millimeters (more typically between 2 and 4 in a preferred embodiment).

Further the operating region of the cam surface 112 can comprise an average slope of between about 15 and 60 (more preferably between 35 and 45), to provide a desired torque requirement for overcoming the torsion locking by a service mechanic.

Turning next to the second embodiment shown in FIGS. 6-8, a filter cartridge is shown that is identical and employs the same components as filter cartridge 12 shown in FIGS. 1-5 other than as indicated below, and specifically in that an alternative stake arrangement is provided in this second illustrated embodiment. Accordingly, the disclosure of the first embodiment of FIGS. 1-5 is applicable to the present embodiment, and also disclosure herein relating to this embodiment is also applicable to the first embodiment. Accordingly, same reference numbers may be used and focus will be had on modifications in different parts relative to the first embodiment.

Figure 6:
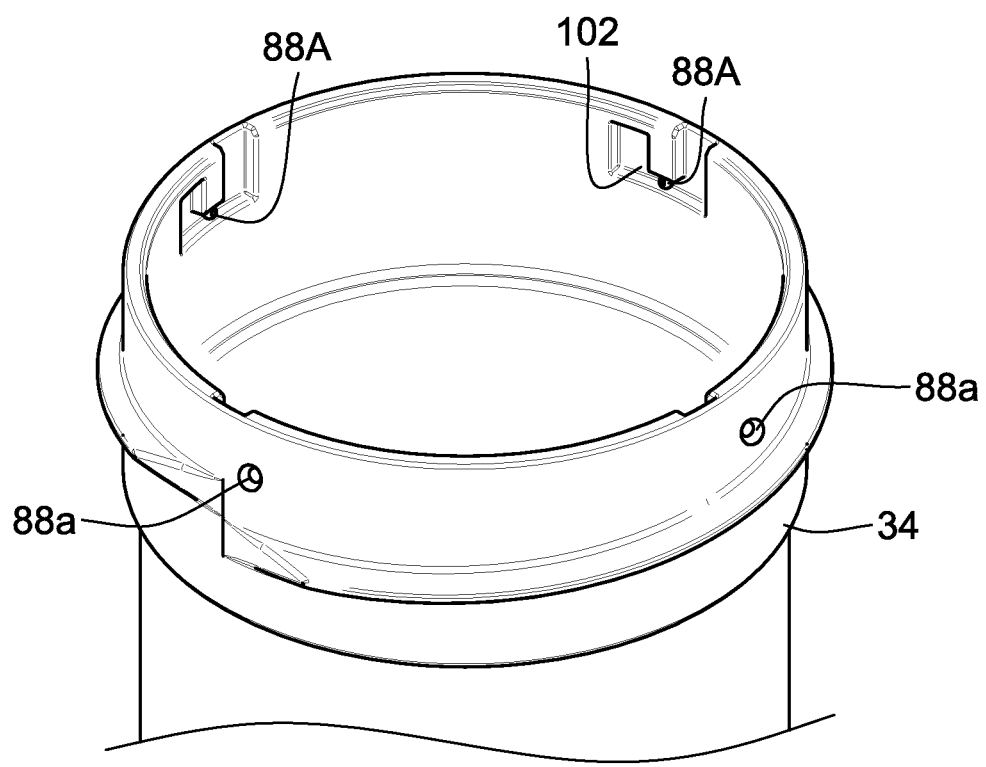
FIG. 6 is an isometric view of an alternative stake location shown in the canister of a filter cartridge according to a second illustrated embodiment, with the remaining contents of the filter cartridge not shown to better illustrate the stake.
Figure 7:
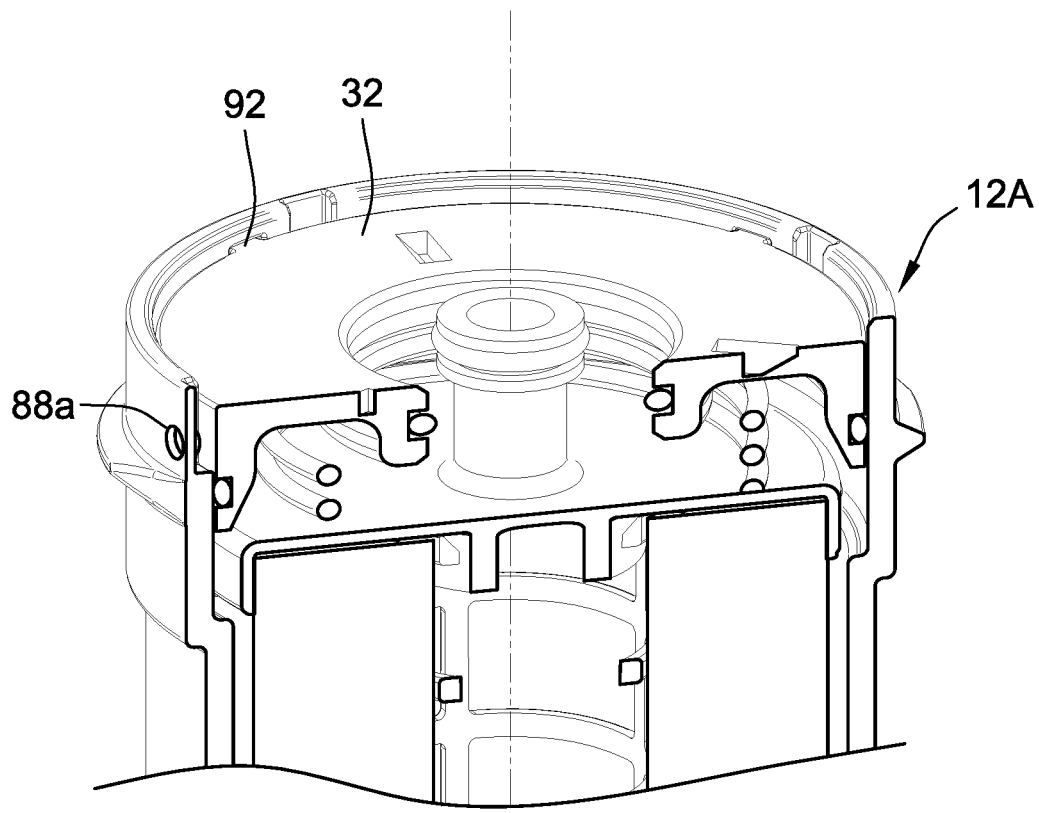
FIG. 7 is an isometric and cross-section view of such a filter cartridge according to the second illustrated embodiment of FIG. 6 with the additional filter cartridge components illustrated.
Figure 8:
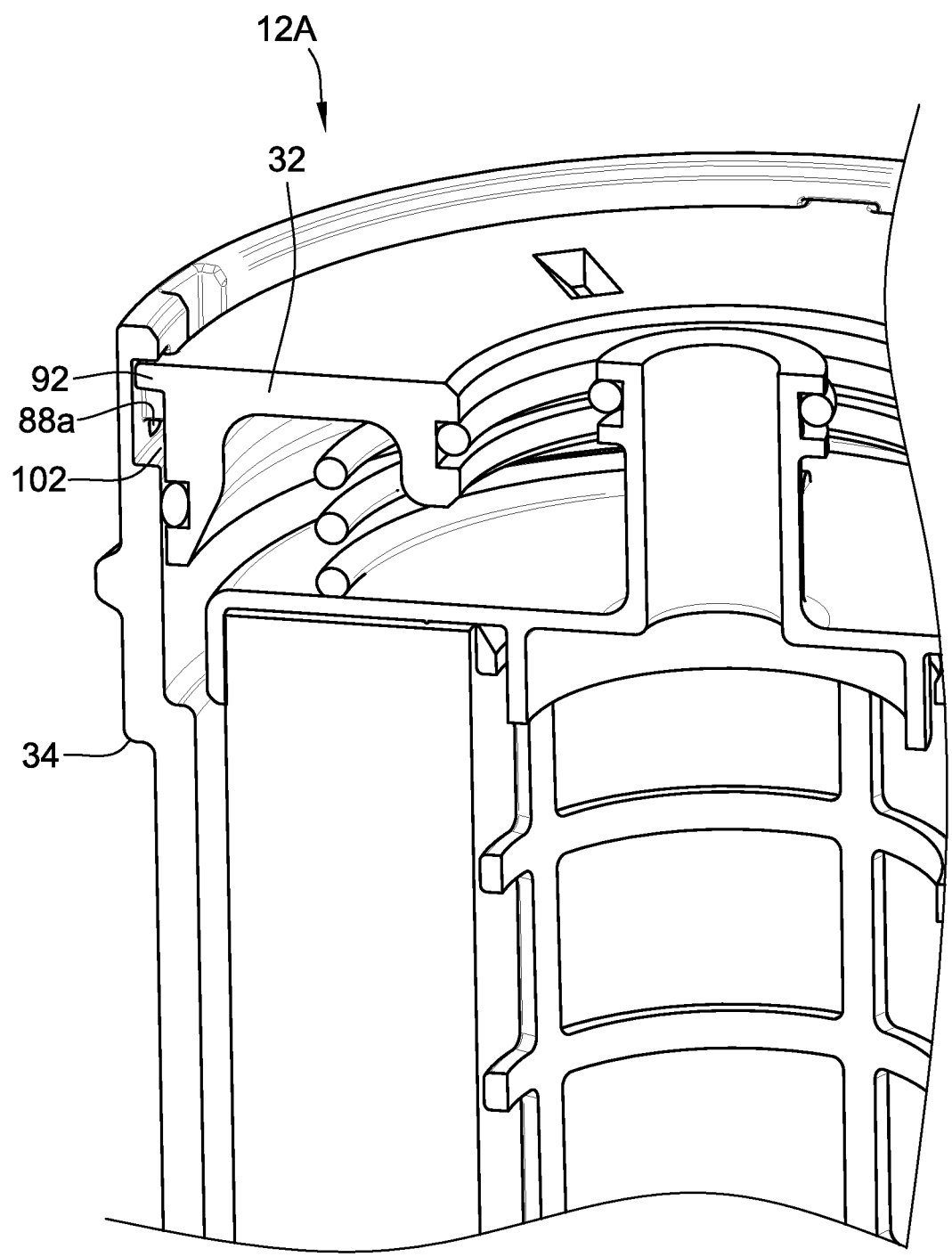
FIG. 8 is an enlarged cross-sectional view of a portion of the filter cartridge shown in FIG. 7 taken from a slightly different perspective.

Referring to FIGS. 6-8, an alternative embodiment and location of stakes 88A are formed into the canister 34 to provide a catch member that is arranged to restrain the baseplate 32. For example, stake 88A can be ultrasonically deformed and thereby thermally deformed into the plastic material of the canister 34 at an alternative location that is not axially over the baseplate 32 as was the case in the first embodiment, but in this example is shown to be formed into the radially extending slot portion 102 of the slot configuration. This way, the retention tabs 92 of the baseplate 32 are trapped and cannot be removed from the slot configuration. Accordingly, the stakes 88 shown with reference to FIG. 2 in the first embodiment may not be provided in this embodiment with the alternative location and of thermally deformed stakes 88A, that can be formed such as by ultrasonic deformation which thermally deforms the plastic material of the canister 34.

Thus this provides an alternative embodiment of filter cartridge 12A according to a second illustrated embodiment. It is noted that during assembly of this embodiment like the next embodiment that the baseplate 32 is first fully installed within the slot configuration. Thus, the ultrasonic deformation is conducted only after the remaining filter components are installed. It is understood that the illustration shown in FIG. 6 for example is for illustrative purposes only to better show stakes 88A and locations and that heat stakes 88A are only truly formed once the remaining filter components are installed within the canister.

Figure 9:
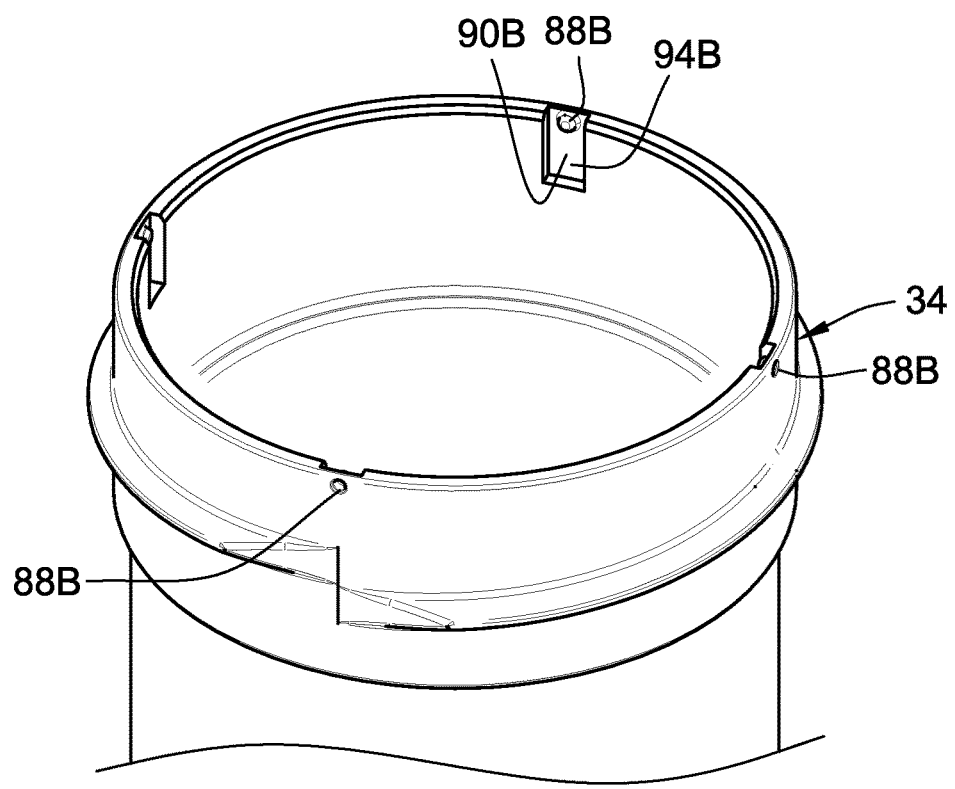
FIG. 9 is an isometric view of a third illustrated embodiment of a canister for a filter cartridge also similar to the first embodiment, but with the filter cartridge components removed from the canister to better illustrate the stake aspects.
Figure 10:
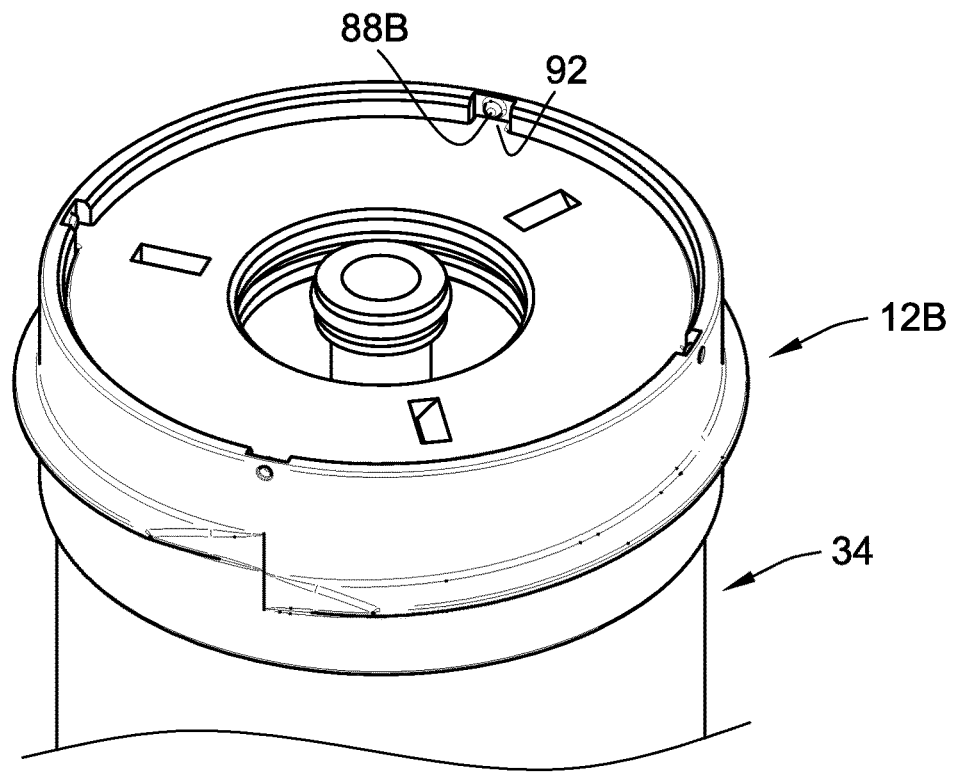
FIG. 10 is an isometric view of the third illustrated embodiment of FIG. 9 but with the remaining filter cartridge components being illustrated.
Figure 11:
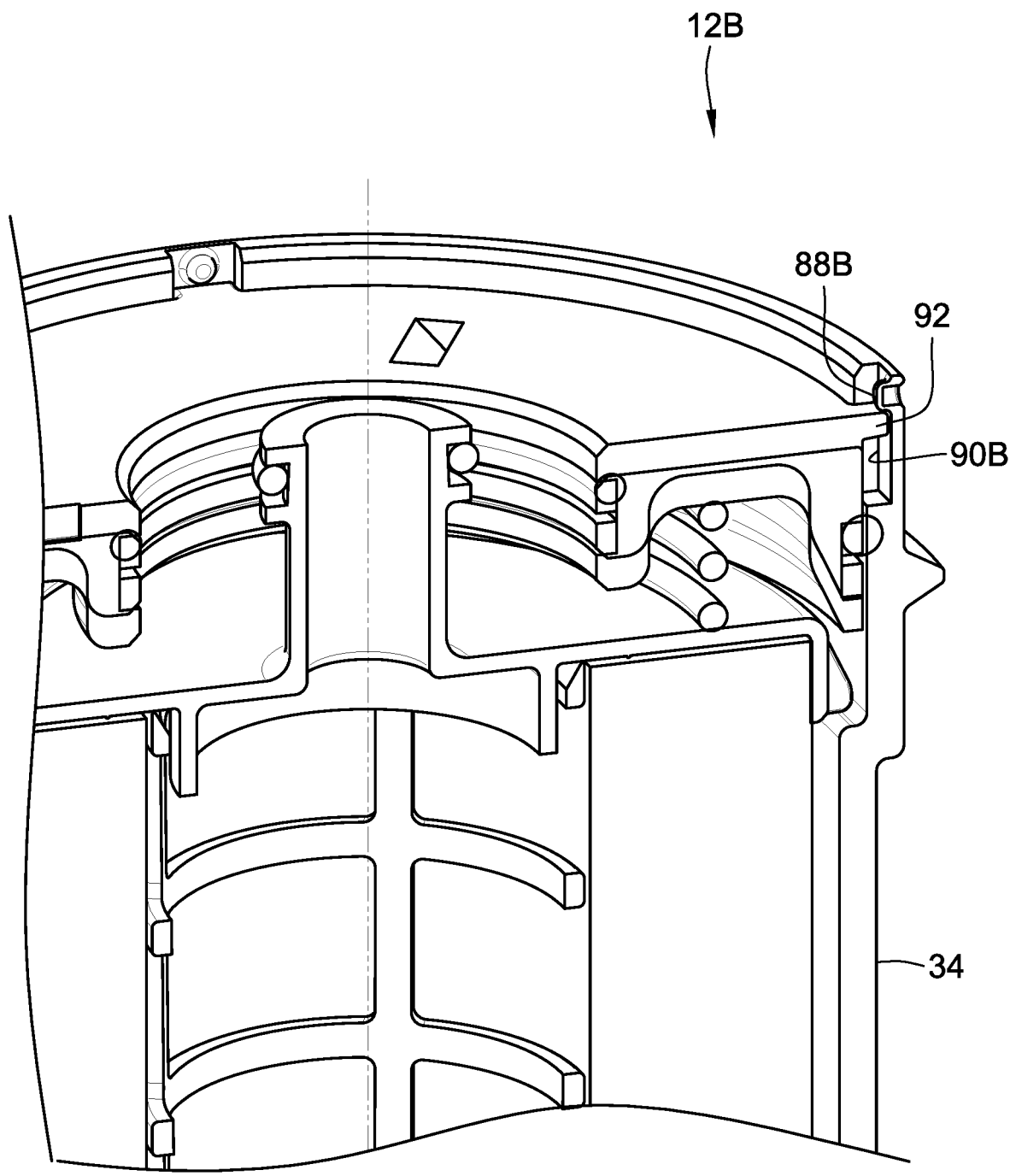
FIG. 11 is an isometric view and cross-section taken about a plane through the central axis of the filter cartridge shown in FIG. 10.
Figure 12:
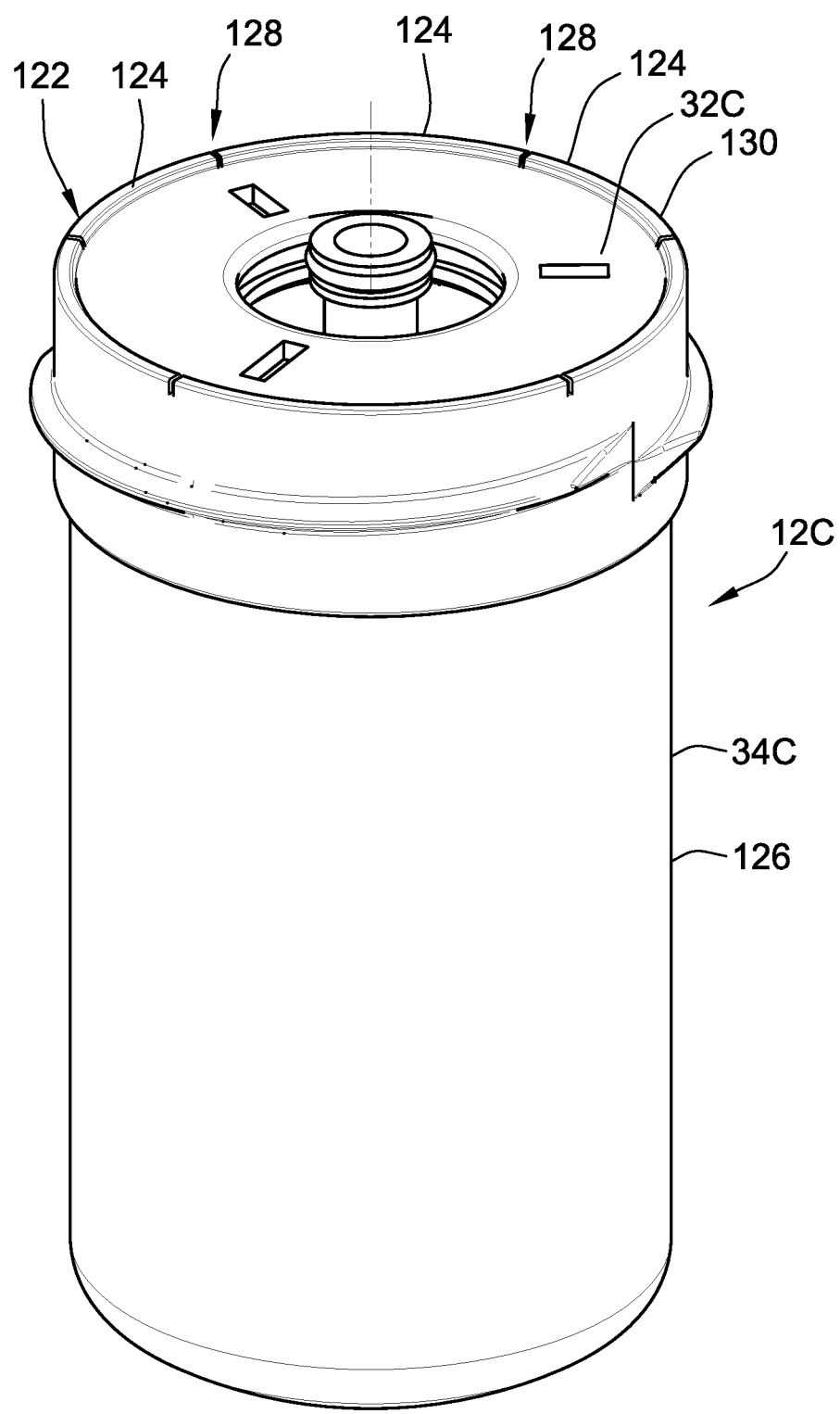
FIG. 12 is a fourth illustrated embodiment of a filter cartridge in which the catch mechanism comprises a snap such as axially extending snap fingers.
Figure 13:
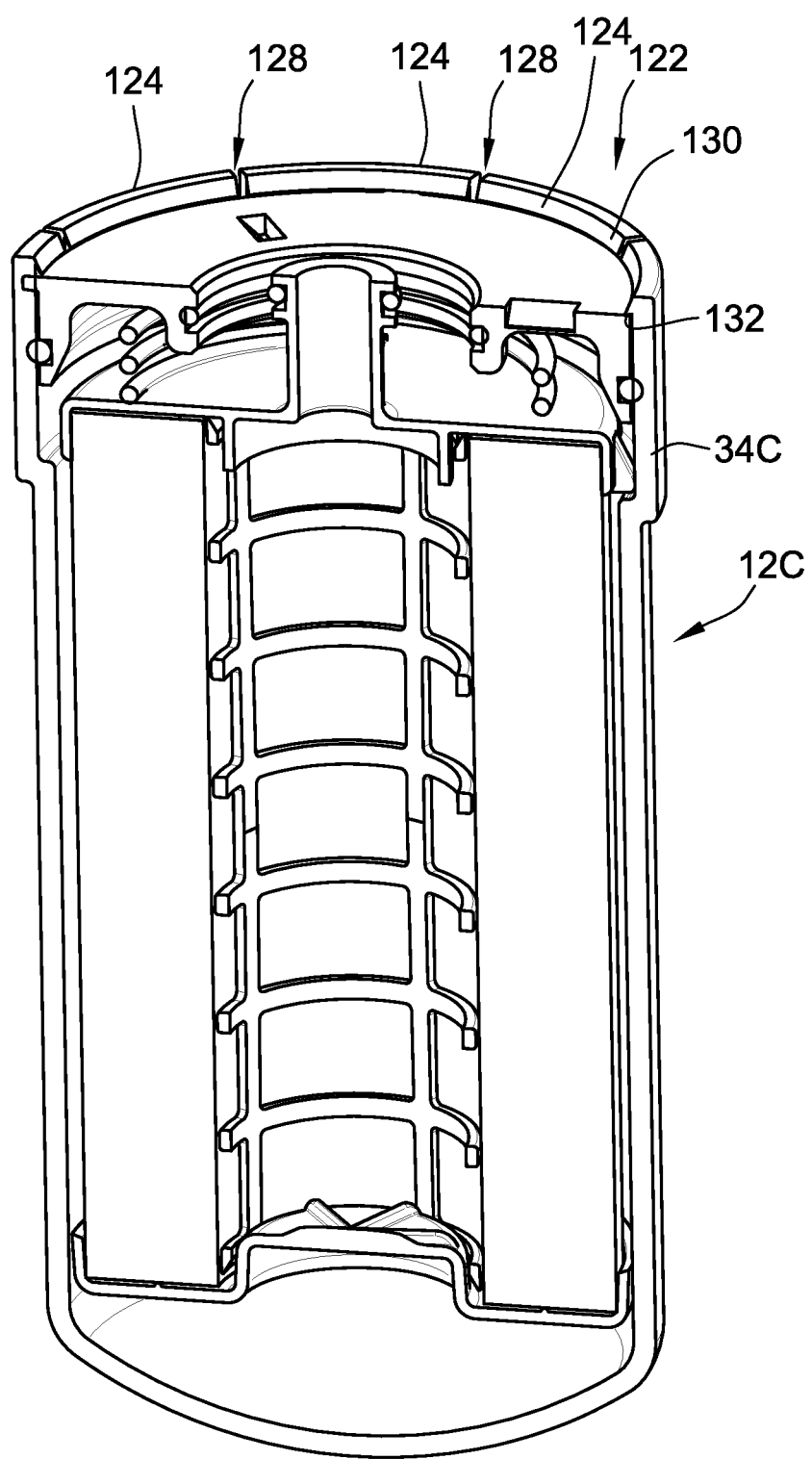
FIG. 13 is an isometric and cross-sectional illustration taken along a plane through the central axis of the filter cartridge shown in FIG. 12.
Figure 14:
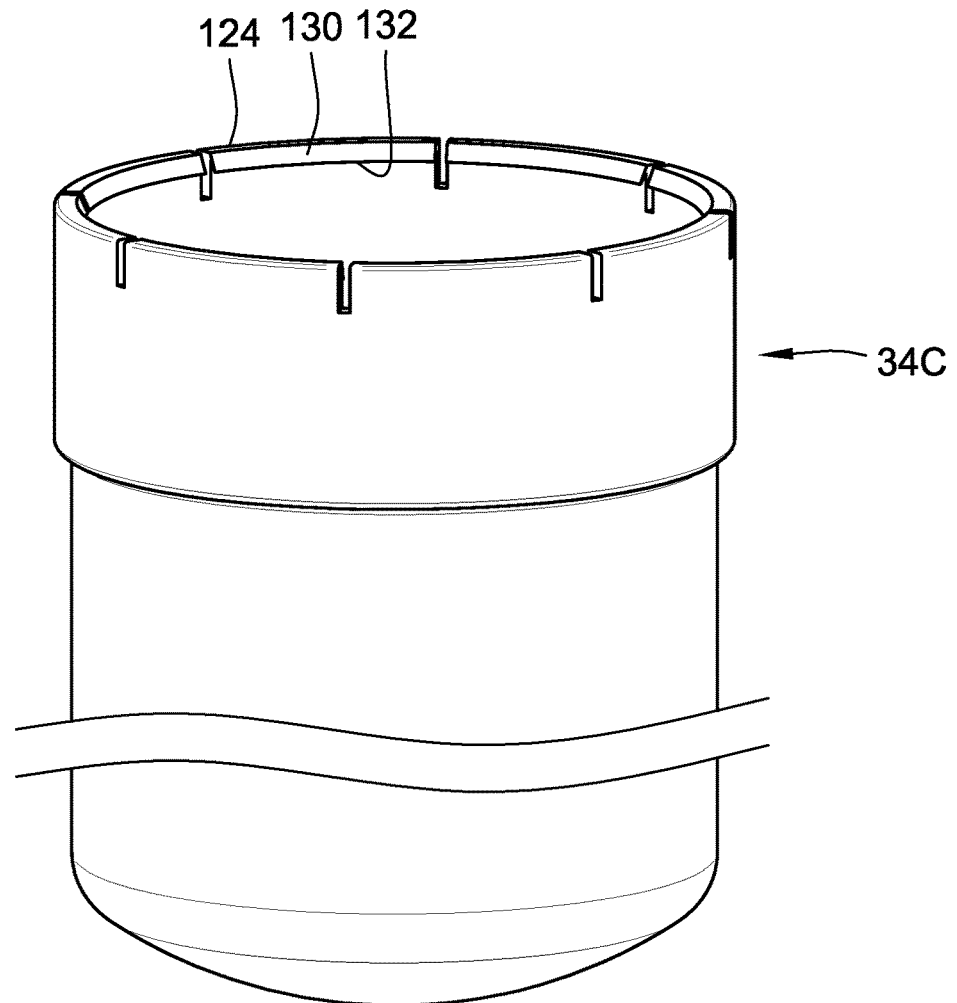
FIG. 14 is an isometric view of the canister used in the filter cartridge of FIG. 12.
Figure 15:
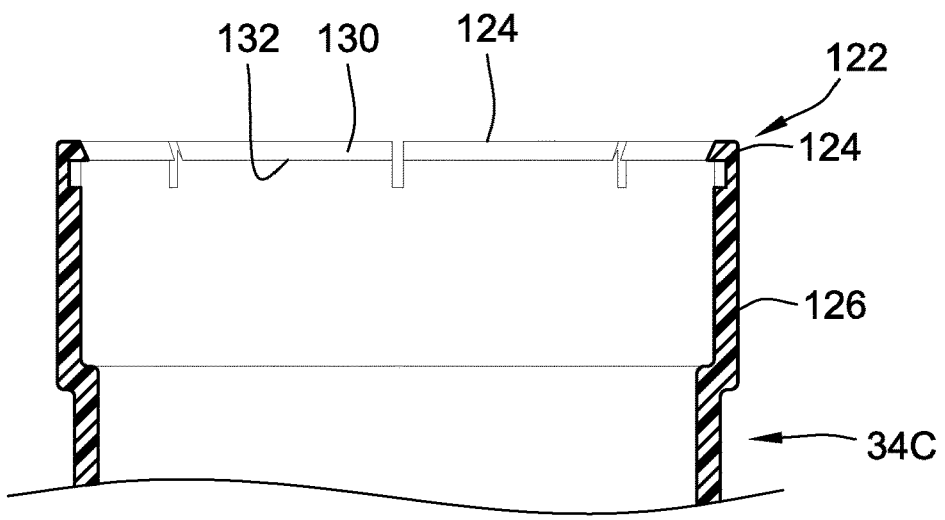
FIG. 15 is an enlarged view of an upper portion of the canister taken from a side view and in cross-section, with the lower portion of the canister being omitted.

Turning to a third illustrated embodiment shown in FIGS. 9-11, a filter cartridge 12B is illustrated that is understood to employ the same components as filter cartridge 12 shown in the first illustrated embodiment of FIGS. 1-5. Accordingly, the disclosure of the first embodiment of FIGS. 1-5 is fully applicable to the present embodiment other than as indicated below and similarly, disclosure herein related to the third embodiment and features for example shown in the illustrations are also equally applicable to the first embodiment. Accordingly, the same reference numbers may be used and focus will be had relative to modifications relative to the first embodiment in relation to the alternative slot configuration and staking location provided in the canister 34.

As shown herein, the canister 34 includes a slot configuration 90B that may comprise only a single slot segment such as axially extending slot portion 94B to receive the retainer tabs 92. Once the retainer tabs 92 are installed in the slot portion 94B, the stakes 88B can be formed such as through ultrasonic thermal deformation or other such similar thermal deformation that forms radially inward projections extending into the slot that serve to trap the retainer tabs 92 within the slot portion 94B between the bottom of slot portion 94B with the entrance region of slot portion occupied by the stake 88B. Accordingly, this accomplishes a similar slot retention like the second illustrated embodiment.

In comparison to the second illustrated embodiment, this third illustrated embodiment employs a more simplistic slot configuration although the piston needs to be loaded against the spring in order to facilitate heat deformation of stakes 88B during assembly whereas no such loading is necessitated in the second illustrated embodiment considering that it also includes the abutment stop portion 100 in the slot configuration like the first embodiment. Additionally, the stake 88A of the second embodiment prevents rotational movement of the baseplate so as to restrain the baseplate such that the overall catch axially retains the cap to the canister whereas in this embodiment the stake 88B itself also performs the function of axially retaining the cap to the canister.

Turning to a fourth illustrated embodiment shown in FIGS. 12-15, a filter cartridge 12C is shown that is understood to employ the same components as filter cartridge 12 previously shown in FIGS. 1-5 other than as indicated below. Accordingly, the disclosure of the first embodiment of FIGS. 1-5 is fully applicable to the present embodiment other than as indicated below and features related to component parts in patent illustrations herein are likewise understood to apply to the first embodiment other than differences noted. Accordingly, like reference numbers may be used and focus will be had relative to modifications and different parts of this fourth illustrated embodiment relative to the first illustrated embodiment.

In this filter cartridge 12C, the catch is provided as a different mechanism in the form of a resilient snap mechanism 122 that can be formed integrally into the canister 34C, preferably monolithically during plastic injection molding techniques. For example, the snap mechanism 122 can flex inwardly and outwardly and may or may not provide an audible indication of when snap action takes place to secure the remaining filter components within the canister 34C such as the baseplate 32C and the internal filter element.

The resilient snap mechanism 122 can be provided for by a plurality of finger projections 124 that can be formed at the terminating end of a solid ring portion 126 of the canister 34C. For example, the finger projections 124 can extend axially from the solid ring portion 126.

The finger projections 124 are formed of the plastic material and therefore resilient and radially flexible inwardly and outwardly such as due to axially extending gaps 128.

Further, each finger projection can include a cam install surface 130 that has a ramp that extends inclined relative to the central axis that faces away from the solid ring portion 126, as well as a catch ledge 132 along the underside and internal region that faces toward the solid ring portion 126.

The baseplate 32C is much like the baseplate 32 illustrated in the first embodiment other than retention tabs 92 illustrated for the first embodiment need not be provided, but instead the perimeter may be a circular perimeter and/or other appropriate perimeter that is configured to engage with the cam install surface 30 and slide along the ramp during installation to force the resilient finger projections 124 radially outwardly and stretch those so that the baseplate 32C can slide past the snap mechanism and be caught on the underside by the catch ledge 132 during installation. This facilitates snap action installation and retention of the baseplate 32C along with the filter element and other filter component shown in the first embodiment within the canister 34C for this embodiment. The cam install surface may extend substantially at an inclined angle such as between 10° and 80° relative to the central axis while the catch ledge 132 may extend perpendicular or alternatively along a reverse incline relative to the central axis such that when the spring contained in the element urges the baseplate axially outwardly, the catch ledge 132 provides force and does not stretch or move the axially extending finger projections 124 radially outwardly.

It will be appreciated that any of these staking or snap mechanism structures shown in the first through fourth embodiments may also be used to secure baseplate caps in a variety of different filter embodiments and cartridges and provides for improvements relative to such filter examples such as mentioned in the background for example.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge, comprising:
a canister having an open end and a second canister end opposite the open end;
a piston carried by the canister, the piston providing a cap capping the open end to provide a filter chamber in the canister, the piston having a range of sliding movement relative to the canister,
an inlet port through the open end for receiving unfiltered fluid provided through the piston:
an outlet port through the open end for returning filtered fluid;
a filter media extending in the filter chamber and along a fluid flow path that extends from the inlet port to the outlet port with the filter media being arranged in fluid series between the inlet port and the outlet port; and
wherein the piston has a central aperture to accommodate the inlet port and the outlet port therethrough; and wherein the piston has an outer annular surface in sliding contact with an inner annular surface of the canister along a non-threaded sliding interface therebetween.

2. The filter cartridge of claim 1, further comprising a spring member in the canister, the spring member arranged to bias the piston away from the second canister end.

3. The filter cartridge of claim 1, further comprising a mounting thread provided by the canister.

4. The filter cartridge of claim 1, further comprising an filter element including the filter media, wherein the filter element is positioned in the canister and comprises:
 a ring of filter media having a first media end and a second media end;
 a first end cap sealingly bonded to the first media end and positioned in spaced relation to the piston, wherein a portion of the fluid flow path is provided between the first end cap and the piston; and
 a second end cap sealingly bonded to a second media end of the ring of filter media.

5. The filter cartridge of claim 4, further comprising an annular spring chamber defined between the first end cap and the piston, further comprising a coil spring arranged in the annular spring chamber and biasing the piston away from the filter element.

6. The filter cartridge of claim 4, wherein the first end cap is an open end cap comprising a ring portion for sealingly bonding to the first end and a snout extending axially from the ring portion, the snout providing the outlet port and extending through the piston, the piston defining a central piston opening surrounding the snout and defining the inlet port.

7. The filter cartridge of claim 6, further comprising a radially outward directed radial seal positioned on the snout; and a radially inward directed radial seal positioned along the central piston opening.

8. The filter cartridge of claim 4, wherein the canister defines an annular seating surface, a plurality of locating fins being along an outer periphery of the first end cap, the locating fins seated on the annular seating surface.

9. The filter cartridge of claim 1, further comprising a ring gasket sealing between an outer peripheral surface of the piston and inner peripheral surface of the canister.

10. The filter cartridge of claim 1, further comprising a torsion lock detent arranged on the piston and thereby movable relative to the canister.

11. A filter cartridge, comprising:
 a canister having an open end and a second canister end opposite the open end;
 a piston carried by the canister, the piston providing a cap capping the open end to provide a filter chamber in the canister, the piston having a range of sliding movement relative to the canister,
 an inlet port through the open end for receiving unfiltered fluid provided through the piston;
 an outlet port through the open end for returning filtered fluid;
 a filter media extending in the filter chamber and along a fluid flow path that extends from the inlet port to the outlet port with the filter media being arranged in fluid series between the inlet port and the outlet port; and
 further comprising a torsion lock detent arranged on the piston and thereby movable relative to the canister, wherein the piston has an internal side along the filter chamber and external side facing away from the filter chamber, wherein the torsion lock detent is on the external side.

12. The filter cartridge of claim 2, wherein the piston comprises an external circular face and an outer peripheral surface surrounding the external circular face, the outer peripheral surface slidably disposed along an inner peripheral surface of the canister, wherein the torsion lock detent comprises at least one depression formed into the external circular face.

13. The filter cartridge of claim 12, wherein the at least one depression is in the form of a wedge.

14. The filter cartridge of claim 2, further comprising a spring member in the canister, the spring member arranged to bias the piston away from the second canister end.

15. The filter cartridge of claim 14, further comprising a catch provided at the open end and retaining the piston to the canister, the spring member urging the piston in abutment with the catch, and wherein the piston has an outer annular surface in sliding contact with an inner annular surface of the canister.

16. The filter cartridge of claim 2, further comprising an filter element including the filter media, wherein the filter element is positioned in the canister and comprises:
 a ring of filter media having a first media end and a second media end;
 a first end cap sealingly bonded to the first media end and positioned in spaced relation to the piston, wherein a portion of the fluid flow path is provided between the first end cap and the piston; and
 a second end cap sealingly bonded to a second media end of the ring of filter media.

17. The filter cartridge of claim 16, further comprising an annular spring chamber defined between the first end cap and the piston, further comprising a coil spring arranged in the annular spring chamber and biasing the piston away from the filter element.

18. The filter cartridge of claim 17 wherein the first end cap is an open end cap comprising a ring portion for sealingly bonding to the first end and a snout extending axially from the ring portion, the snout providing the outlet port and extending through the piston, the piston defining a central piston opening surrounding the snout and defining the inlet port.

19. The filter cartridge of claim 18, further comprising a radially outward directed radial seal positioned on the snout; and a radially inward directed radial seal positioned along the central piston opening.

20. A filter cartridge, comprising:
 a canister having an open end and a second canister end opposite the open end;
 a piston carried by the canister, the piston providing a cap capping the open end to provide a filter chamber in the canister, the piston having a range of sliding movement relative to the canister,
 an inlet port through the open end for receiving unfiltered fluid provided through the piston;
 an outlet port through the open end for returning filtered fluid;
 a filter media extending in the filter chamber and along a fluid flow path that extends from the inlet port to the outlet port with the filter media being arranged in fluid series between the inlet port and the outlet port;
 a spring member in the canister, the spring member arranged to bias the piston away from the second canister end;
 a catch provided at the open end and retaining the piston to the canister, the spring member urging the piston in abutment with the catch, and wherein the piston has an outer annular surface in sliding contact with an inner annular surface of the canister; and a torsion lock detent provided by the piston and thereby movable relative to the canister wherein the piston has an internal side facing the filter media and external side along an outside of the filter cartridge facing away from the filter media, wherein the torsion lock detent is along the external side.

21. The filter cartridge of claim 20, wherein the catch comprises a slot configuration for axially retaining the piston, the slot configuration being defined along the inner annular surface and comprising:
   a first axially extending slot portion defined extending through a terminating edge of the canister at the open end;
   a second axially extending slot portion in spaced relation to the first axially extending slot portion, the canister defining an abutment stop portion between the terminating edge and the second axially extending slot portion;
   a radially extending slot portion connecting the first axially extending slot portion and the second axially extending slot portion in axial spaced relation from the terminating edge; and
   wherein the piston comprises a retention tab slidable in the slot configuration, the retention tab being installable through the first axially extending slot portion, along the radially extending slot portion and into the second axially extending slot portion with the abutment stop portion arranged to stop the retention tab in the second axially extending slot portion thereby to axially retain the piston to the canister.

22. The filter cartridge of claim 20, wherein the catch comprises a stake arranged to restrain the piston axially or rotationally thereby to axially retain the piston to the canister with the catch.

23. A filtration assembly including a filter cartridge, the filter cartridge, comprising:
   a canister having an open end and a second canister end opposite the open end;
   a piston carried by the canister, the piston providing a cap capping the open end to provide a filter chamber in the canister, the piston having a range of sliding movement relative to the canister,
   an inlet port through the open end for receiving unfiltered fluid provided through the piston;
   an outlet port through the open end for returning filtered fluid; and
   a filter media extending in the filter chamber and along a fluid flow path that extends from the inlet port to the outlet port with the filter media being arranged in fluid series between the inlet port and the outlet port;
   and further comprising a filter head removably connected to the filter cartridge, the filter head comprising: a base portion and an annular rim portion, the base portion comprising an unfiltered inlet and a filtered outlet, the unfiltered inlet in fluid communication with the inlet port upstream of the filter media, the filter outlet in fluid communication with the outlet port downstream of the filter media, the annular rim portion receiving the filter cartridge with a threaded connection between the annular rim portion and the filter cartridge, wherein the piston is arranged to axially abut the base portion; and
   wherein first and second interlocking torsion lock detents are provided on the base portion and the piston, respectively that provide torsion locking between the filter head and the filter cartridge.

24. The filtration assembly of claim 23, wherein the filter cartridge and filter head are configured and arranged such the piston axially abuts the base portion with a force of at least 200 pounds when the filter cartridge is pressurized to a pressure point of at least 2Bar and not greater than 6Bar, thereby making the filtration assembly a rigid body to achieve a natural frequency of greater than 200 Hz at the pressure point.

25. The filtration assembly of claim 23, wherein the first torsion lock detent on the base portion is a fixed stationary projection.

26. The filtration assembly of claim 25, wherein the second torsion lock detent on the piston is in the form of a depression, and wherein a spring urges the piston axially toward the base portion, the spring providing a force of between 50 and 100 pounds.

27. The filtration assembly of claim 23, wherein the filter head comprises an outer cylindrical wall and an inner cylindrical wall providing for a fluid interface, and within the filter head, the unfiltered inlet being ported to a fluid annulus defined between the outer cylindrical wall and the inner cylindrical wall, and the filtered outlet being ported to a central cavity defined within the inner cylindrical wall.

28. The filtration assembly of claim 27, in an installed condition, the piston is received in an annular receptacle region defined between the outer cylindrical wall and the annular rim portion, the piston having a gasket engaging the outer cylindrical wall, the filter cartridge further comprising an internal filter element providing the filter media and contained in the canister; the internal filter element having a snout extending through the piston and having a gasket engaging the inner cylindrical wall.

* * * * *